United States Patent
Kataoka et al.

(10) Patent No.: US 11,391,328 B2
(45) Date of Patent: Jul. 19, 2022

(54) POWER TRANSMITTING APPARATUS

(71) Applicant: Kabushiki Kaisha F.C.C., Hamamatsu (JP)

(72) Inventors: Makoto Kataoka, Hamamatsu (JP); Go Ando, Hamamatsu (JP); Yoshihiko Ozawa, Hamamatsu (JP); Han Hiong Chen, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 154 days.

(21) Appl. No.: 16/751,453

(22) Filed: Jan. 24, 2020

(65) Prior Publication Data

US 2020/0158194 A1 May 21, 2020

Related U.S. Application Data

(63) Continuation of application No. PCT/JP2018/028052, filed on Jul. 26, 2018.

(30) Foreign Application Priority Data

Jul. 27, 2017 (JP) .............................. JP2017-145838

(51) Int. Cl.
*F16D 13/56* (2006.01)
(52) U.S. Cl.
CPC ........ *F16D 13/56* (2013.01); *F16D 2013/565* (2013.01)
(58) Field of Classification Search
CPC .......................... F16D 13/56; F16D 2013/565
See application file for complete search history.

(56) References Cited

U.S. PATENT DOCUMENTS

| | | | | |
|---|---|---|---|---|
| 8,151,963 B2* | 4/2012 | Kataoka | .................. | F16D 13/54 |
| | | | | 192/54.5 |
| 8,336,695 B2* | 12/2012 | Kataoka | .................. | F16D 13/56 |
| | | | | 192/70.2 |
| 9,109,639 B2* | 8/2015 | Satou | ....................... | F16D 13/56 |
| 9,371,867 B2* | 6/2016 | Isobe | ....................... | F16D 13/54 |
| 10,023,203 B2* | 7/2018 | Iida | ........................ | B60W 10/02 |
| 10,247,260 B2* | 4/2019 | Kataoka | .................. | F16D 13/02 |

(Continued)

FOREIGN PATENT DOCUMENTS

| | | |
|---|---|---|
| CN | 106715944 A | 5/2017 |
| EP | 2530348 A1 | 12/2012 |

(Continued)

OTHER PUBLICATIONS

Japanese Notice of Reasons for Refusal dated Mar. 10, 2021 in corresponding Japanese Application No. 2017-145838.

(Continued)

*Primary Examiner* — David R Morris
(74) *Attorney, Agent, or Firm* — Harness, Dickey & Pierce, P.L.C.

(57) ABSTRACT

A transmission device has a clutch spring (8). The clutch spring (8) can generate rotational resistance that occurs when a pressure member (5) rotates relative to a clutch member (4) due to clearance between cam surfaces of a press-contact assisting cam or a back torque limiting cam. Thus, one end (8a) of the clutch spring (8) slides on a surface (10a) of a restricting member 10. A side surface (8b) of the clutch spring (8) is held in the longitudinal direction.

6 Claims, 29 Drawing Sheets

(56) References Cited

U.S. PATENT DOCUMENTS

| | | | |
|---|---|---|---|
| 10,253,825 B2* | 4/2019 | Imanishi | F16D 13/56 |
| 10,670,087 B2* | 6/2020 | Kataoka | F16D 13/52 |
| 2009/0071789 A1* | 3/2009 | Kataoka | F16D 13/56 |
| | | | 192/85.5 |
| 2009/0071792 A1* | 3/2009 | Kataoka | F16D 13/54 |
| | | | 192/93 R |
| 2013/0025997 A1* | 1/2013 | Kataoka | F16D 13/56 |
| | | | 192/70.23 |
| 2014/0326570 A1* | 11/2014 | Isobe | F16D 13/56 |
| | | | 192/70.11 |
| 2015/0041275 A1* | 2/2015 | Satou | F16D 13/40 |
| | | | 192/66.31 |
| 2017/0159725 A1 | 6/2017 | Imanishi | |
| 2017/0184156 A1* | 6/2017 | Kataoka | F16D 23/12 |
| 2019/0226532 A1* | 7/2019 | Kataoka | F16D 43/21 |
| 2020/0340536 A1* | 10/2020 | Nishikawa | F16D 13/52 |
| 2020/0340537 A1* | 10/2020 | Nishikawa | F16D 23/12 |

FOREIGN PATENT DOCUMENTS

| | | |
|---|---|---|
| EP | 2781781 A1 | 9/2014 |
| JP | H0571554 A | 3/1993 |
| JP | 9-79285 | 3/1997 |
| JP | 2002-145085 A | 5/2002 |
| JP | 2010-053988 A | 3/2010 |
| JP | 2013-137039 A | 7/2013 |
| WO | WO-2013-073515 A1 | 5/2013 |
| WO | WO-2016-024557 A1 | 2/2016 |

OTHER PUBLICATIONS

International Search Report dated Oct. 30, 2018 in corresponding PCT Application No. PCT/JP2018/028052.
CA European search report issued in Application No. 18837647.9, dated Feb. 4, 2021.

* cited by examiner

[Fig. 1]
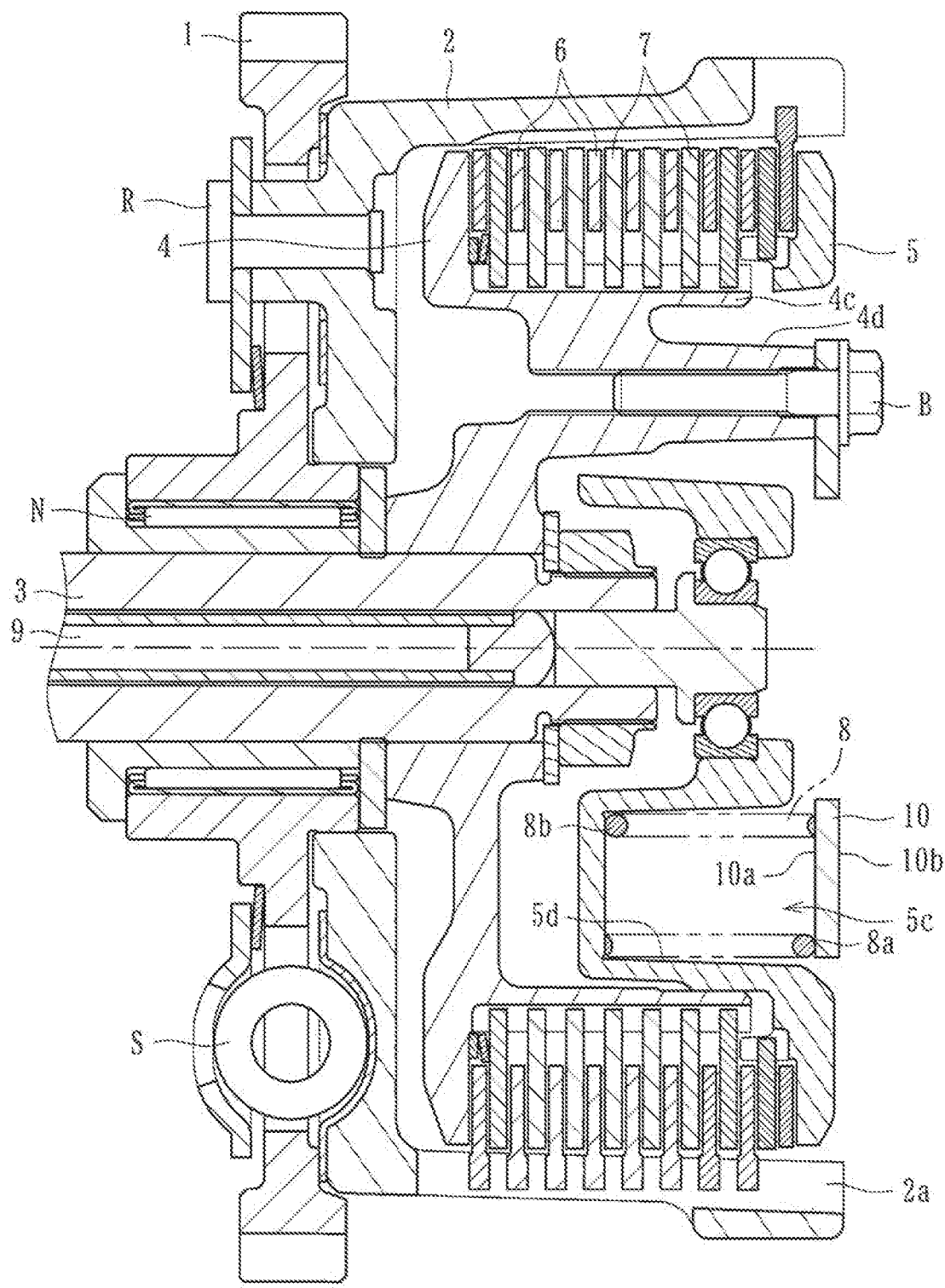

[Fig. 2]
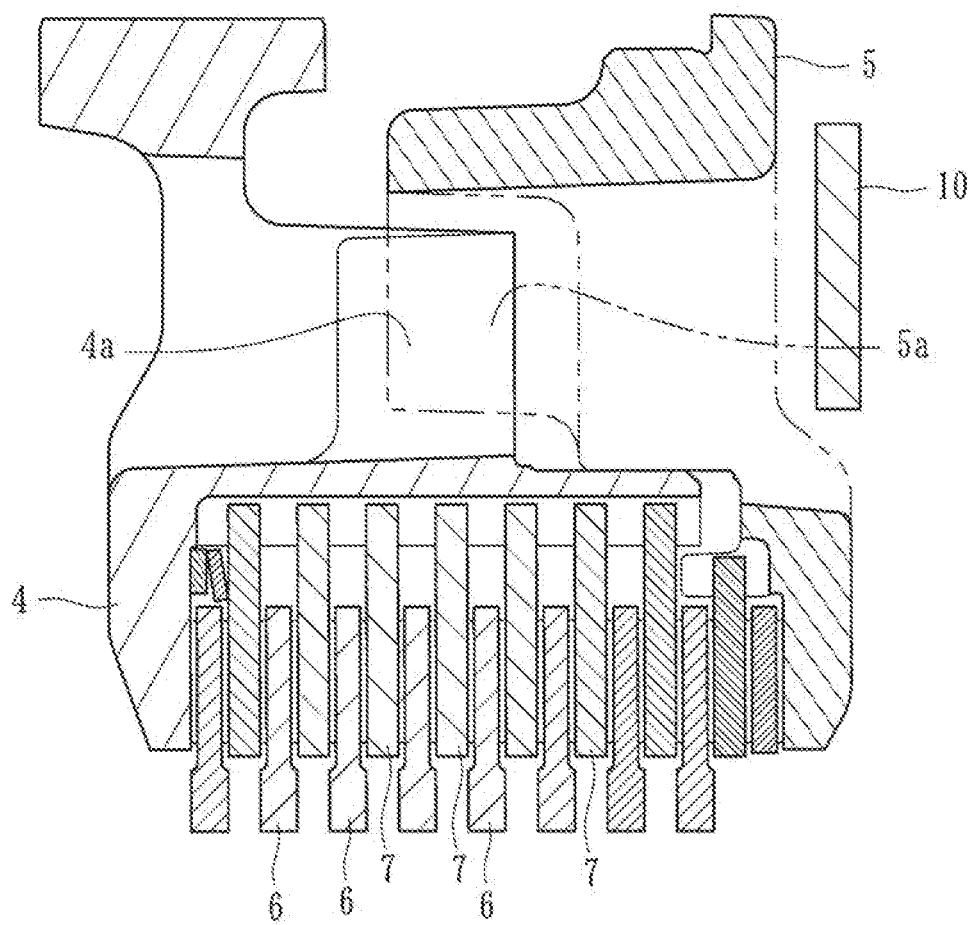

[Fig. 3]
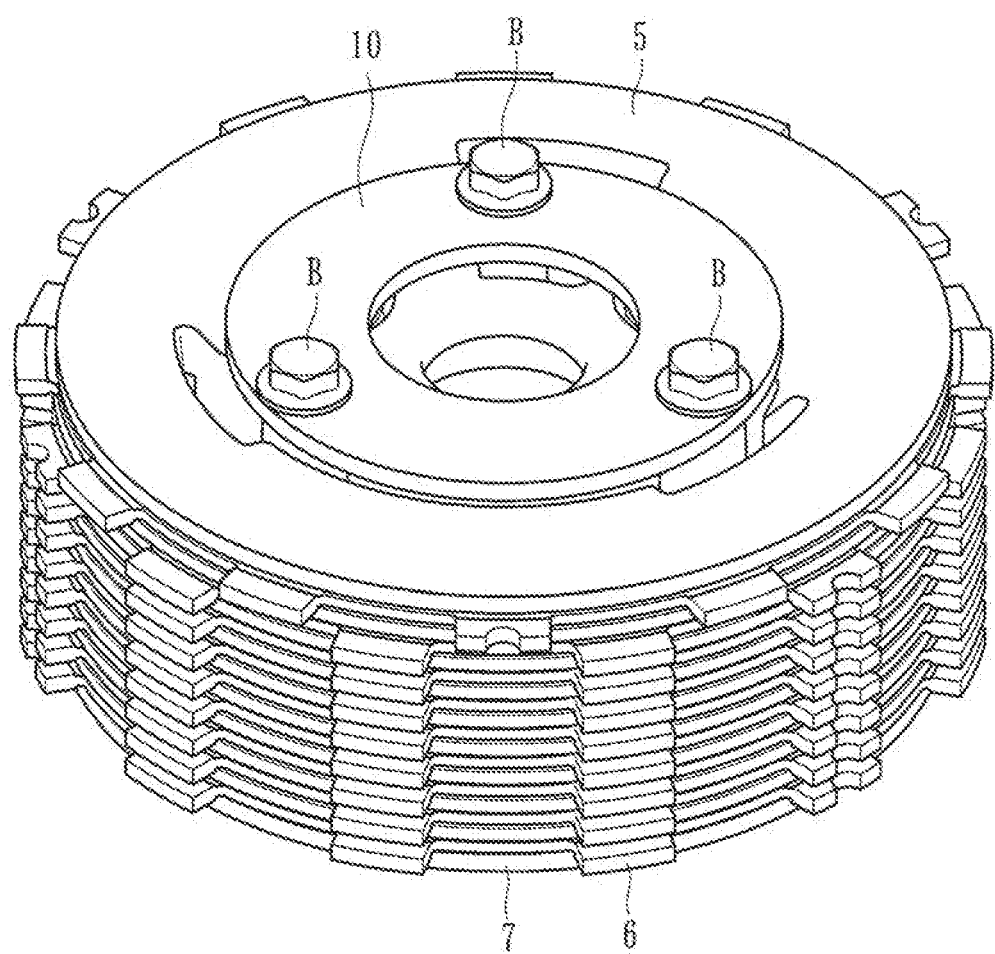

[Fig. 4]
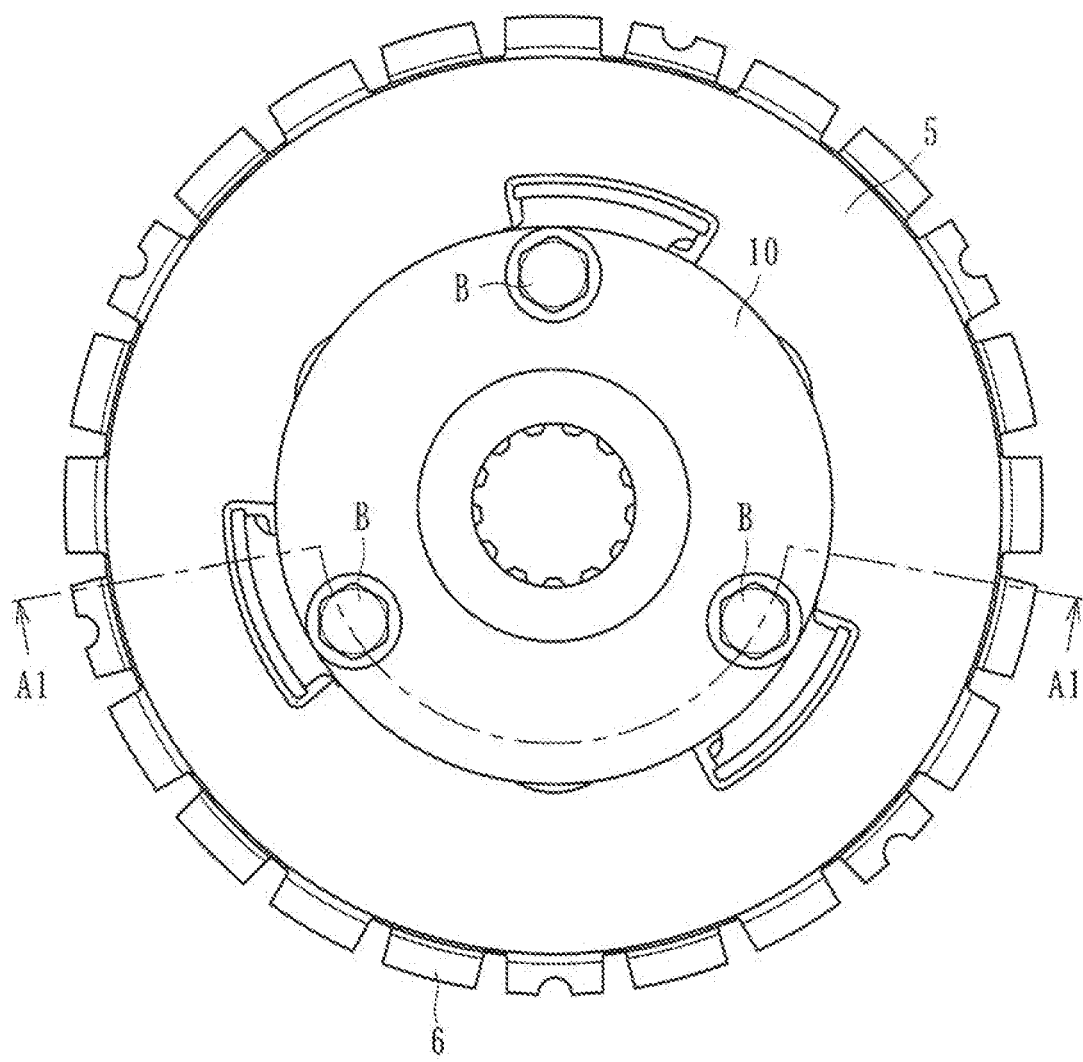

[Fig. 5]
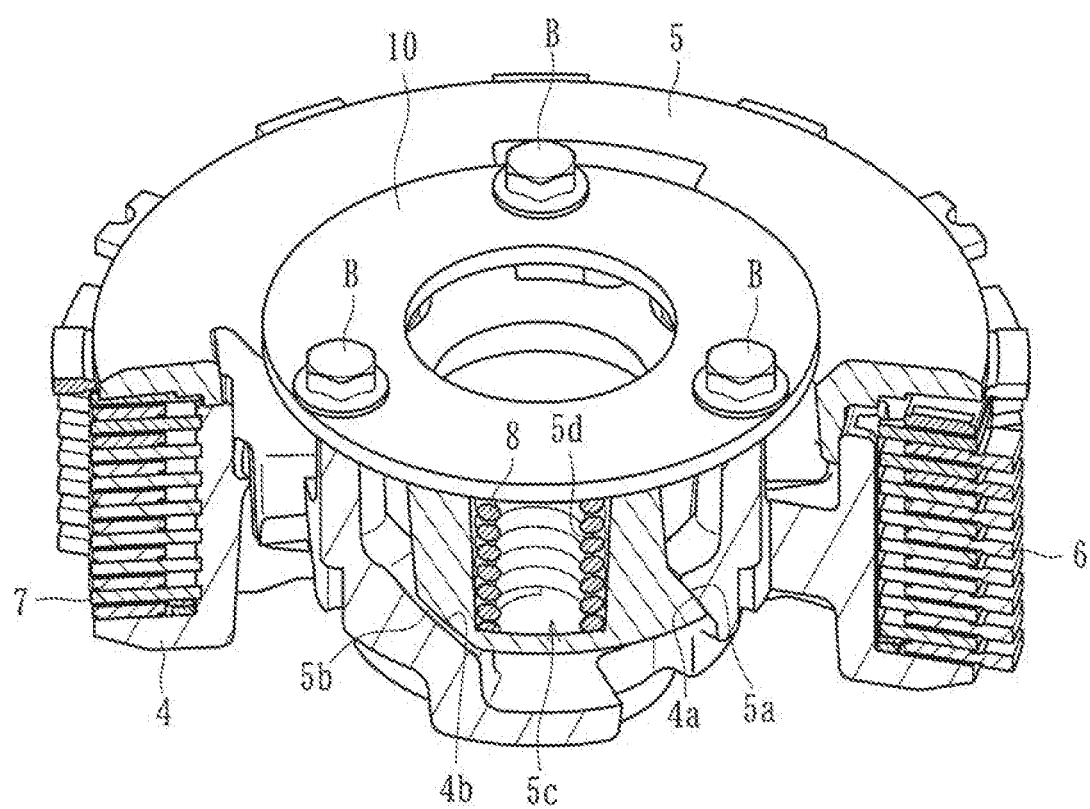

[Fig. 6]
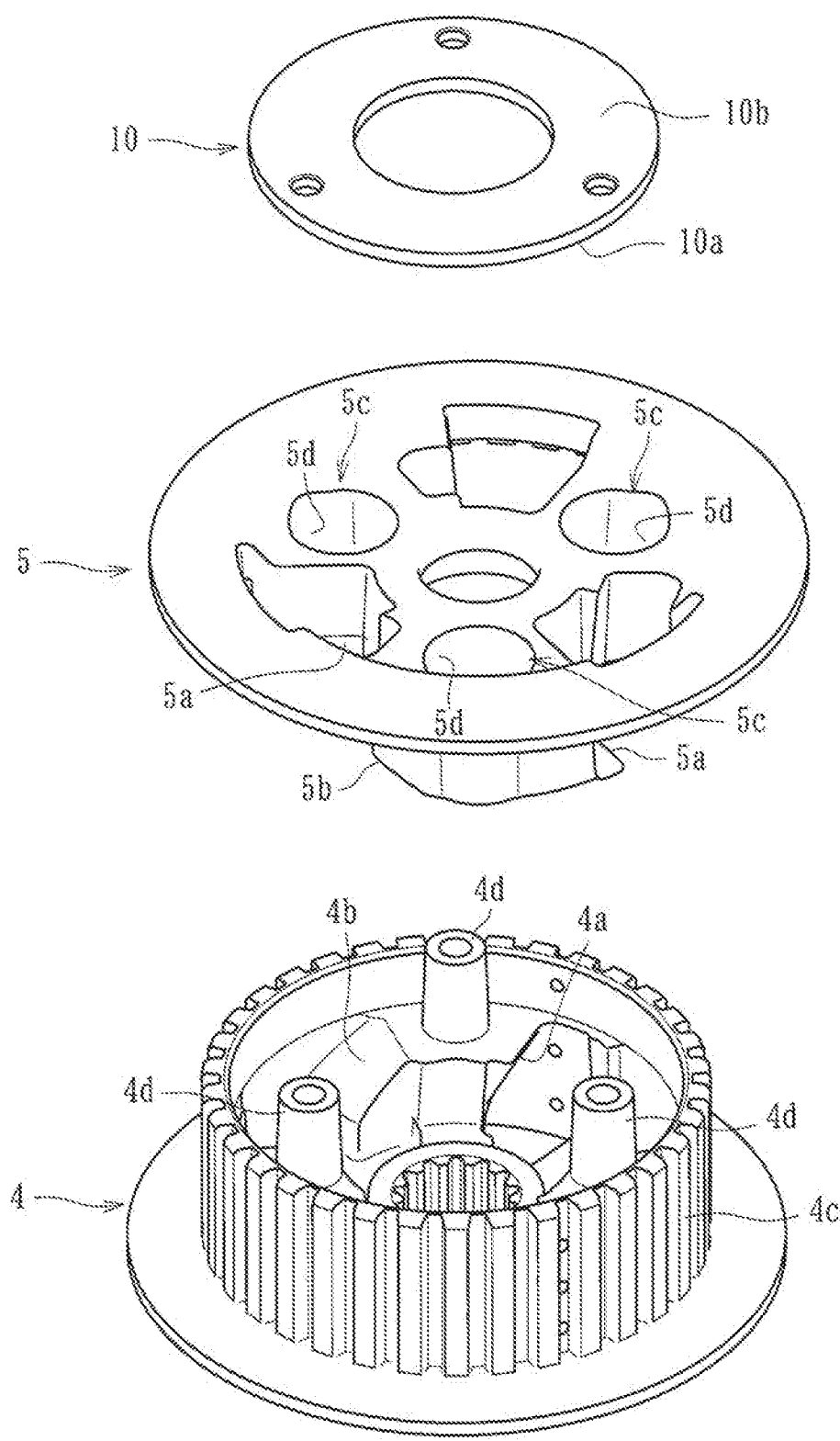

[Fig. 7]
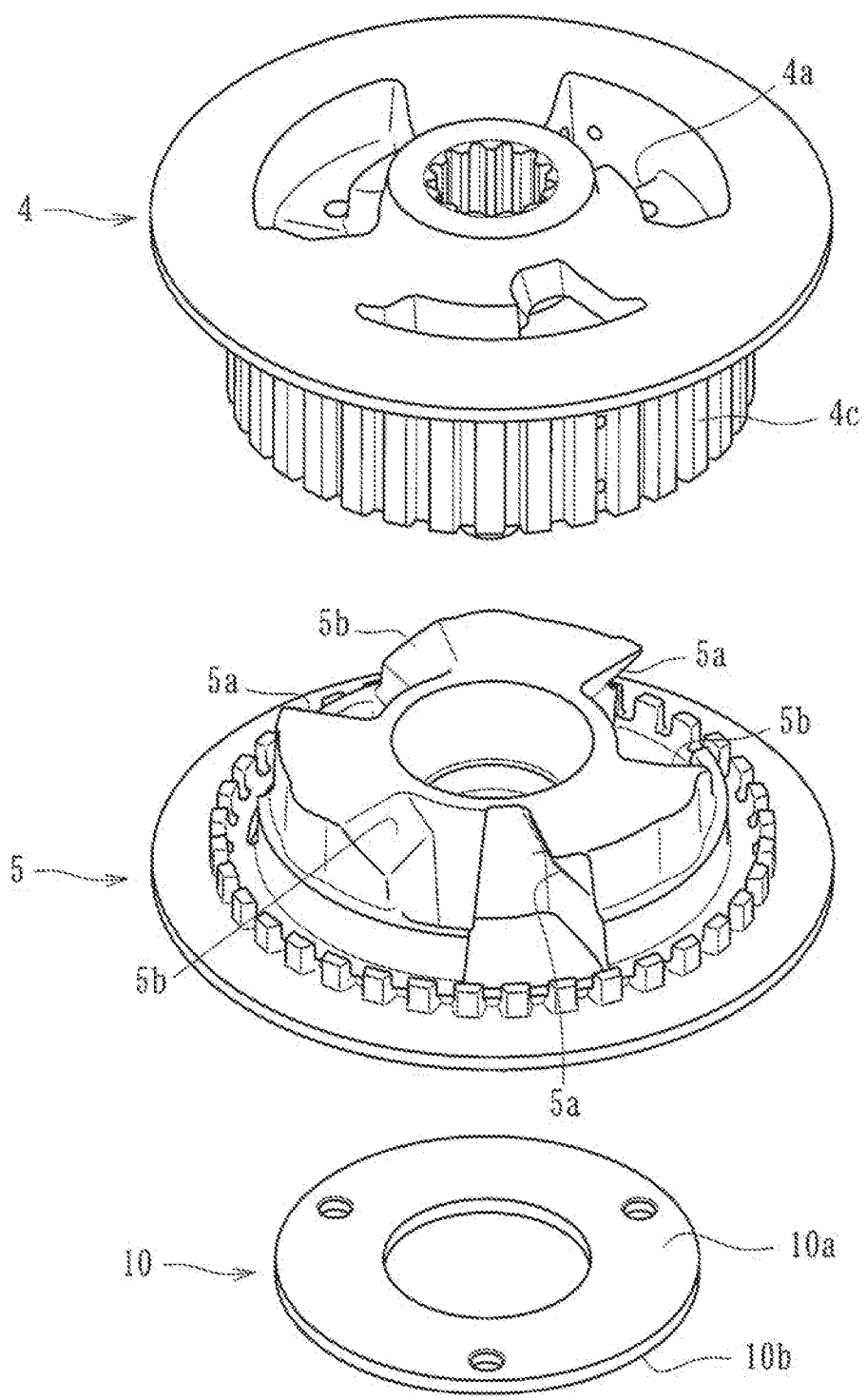

[Fig. 8]
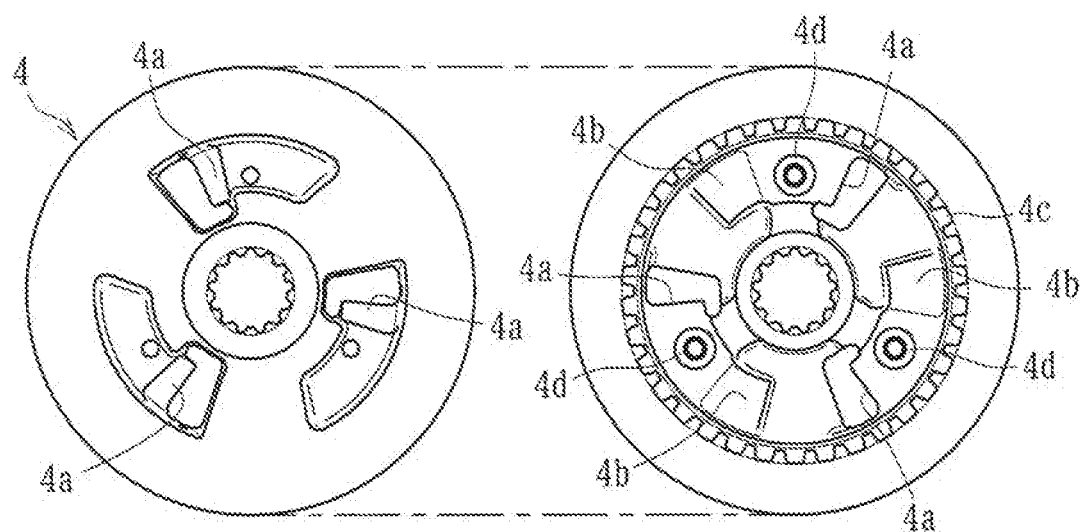
[Fig. 9]
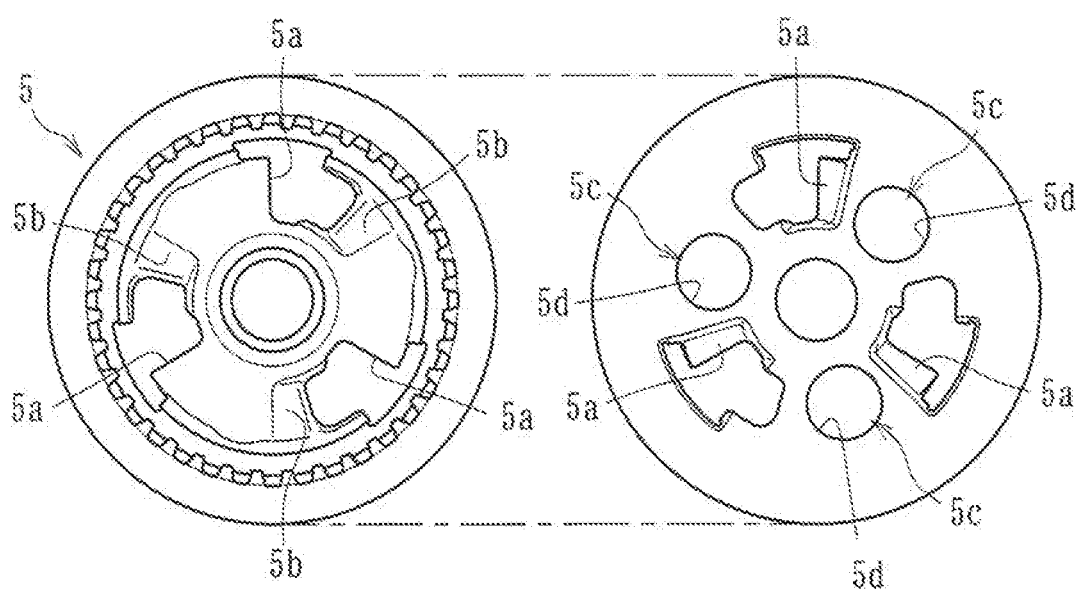

[Fig. 10]
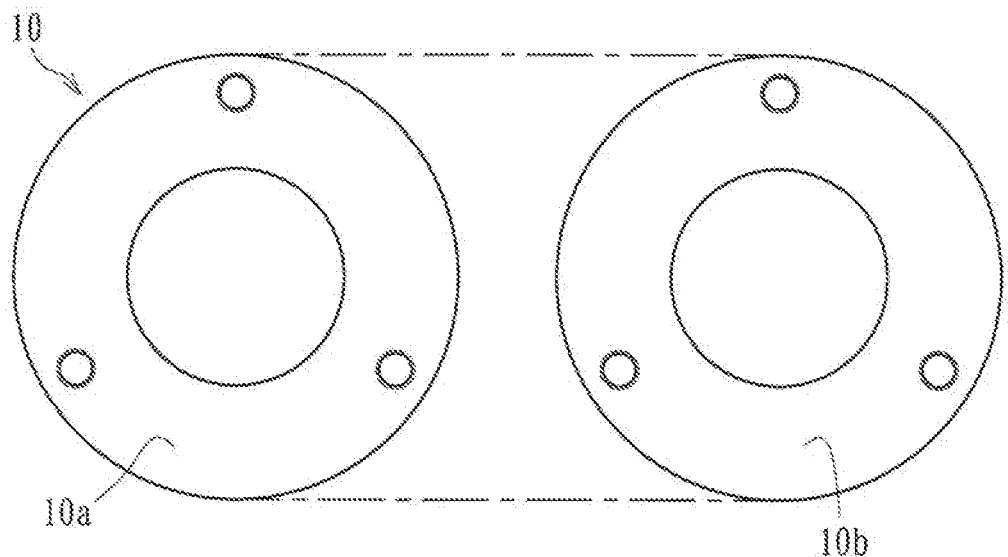
[Fig. 11]
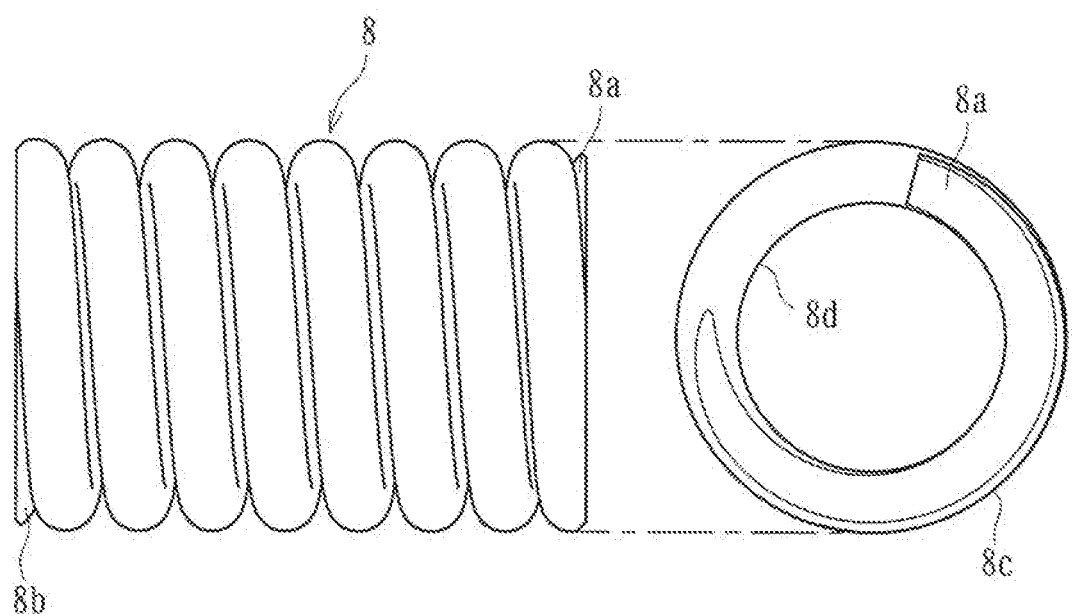

[Fig. 12]
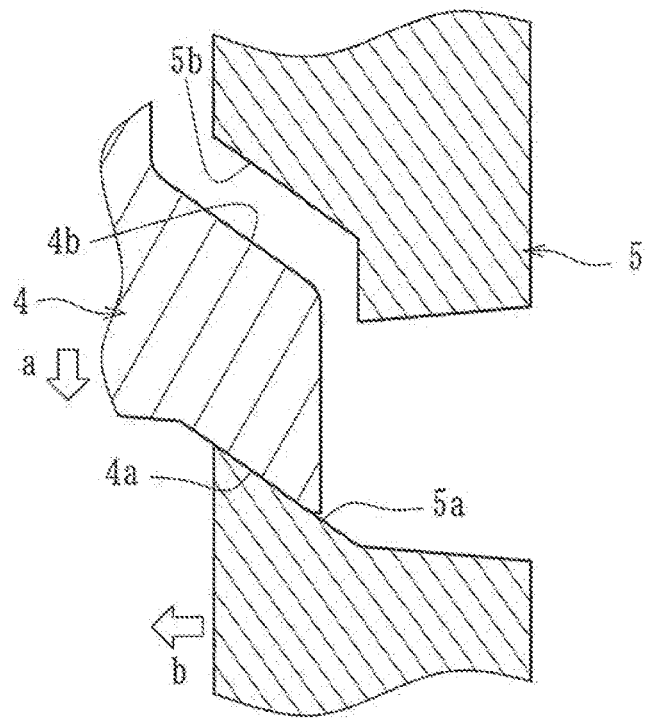
[Fig. 13]
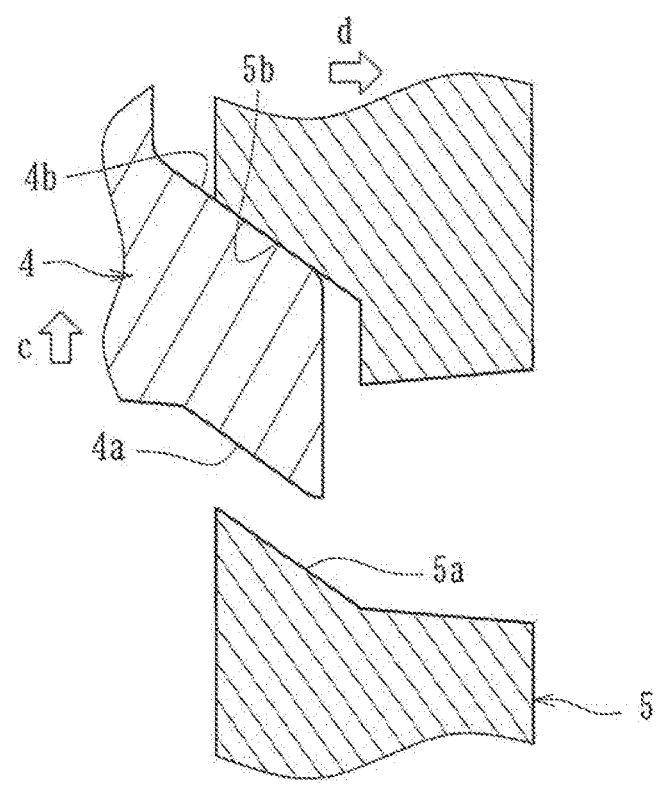

[Fig. 14]
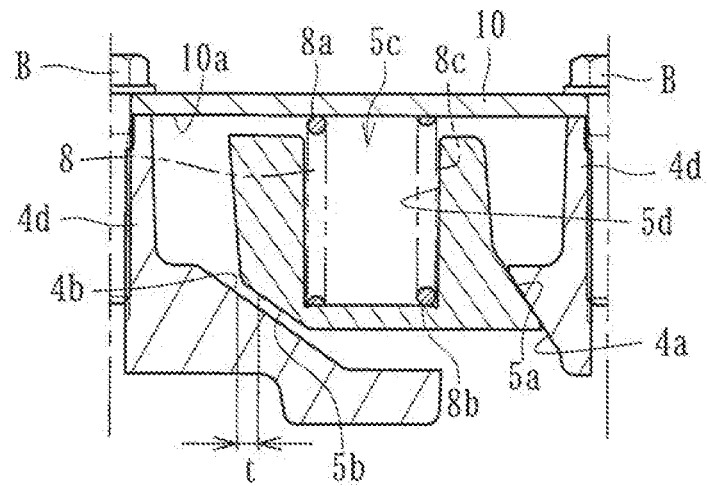
[Fig. 15]
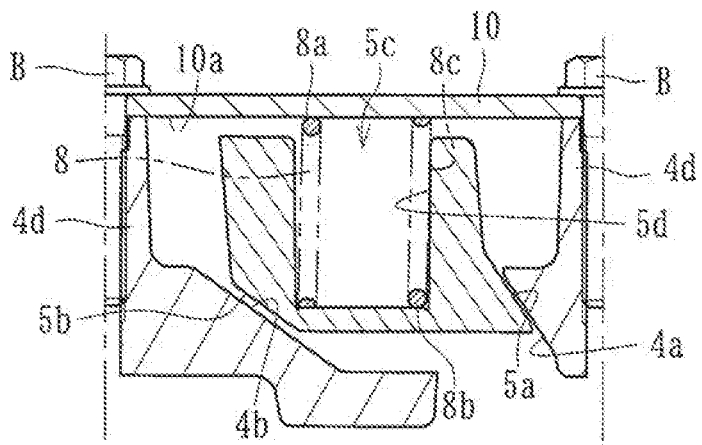
[Fig. 16]
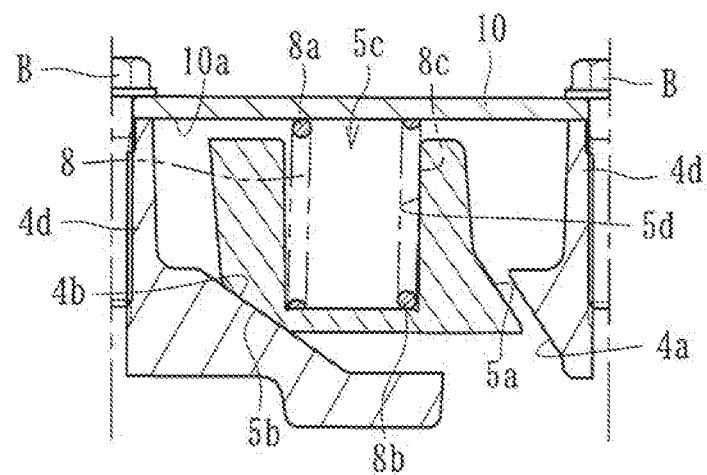

[Fig. 17]
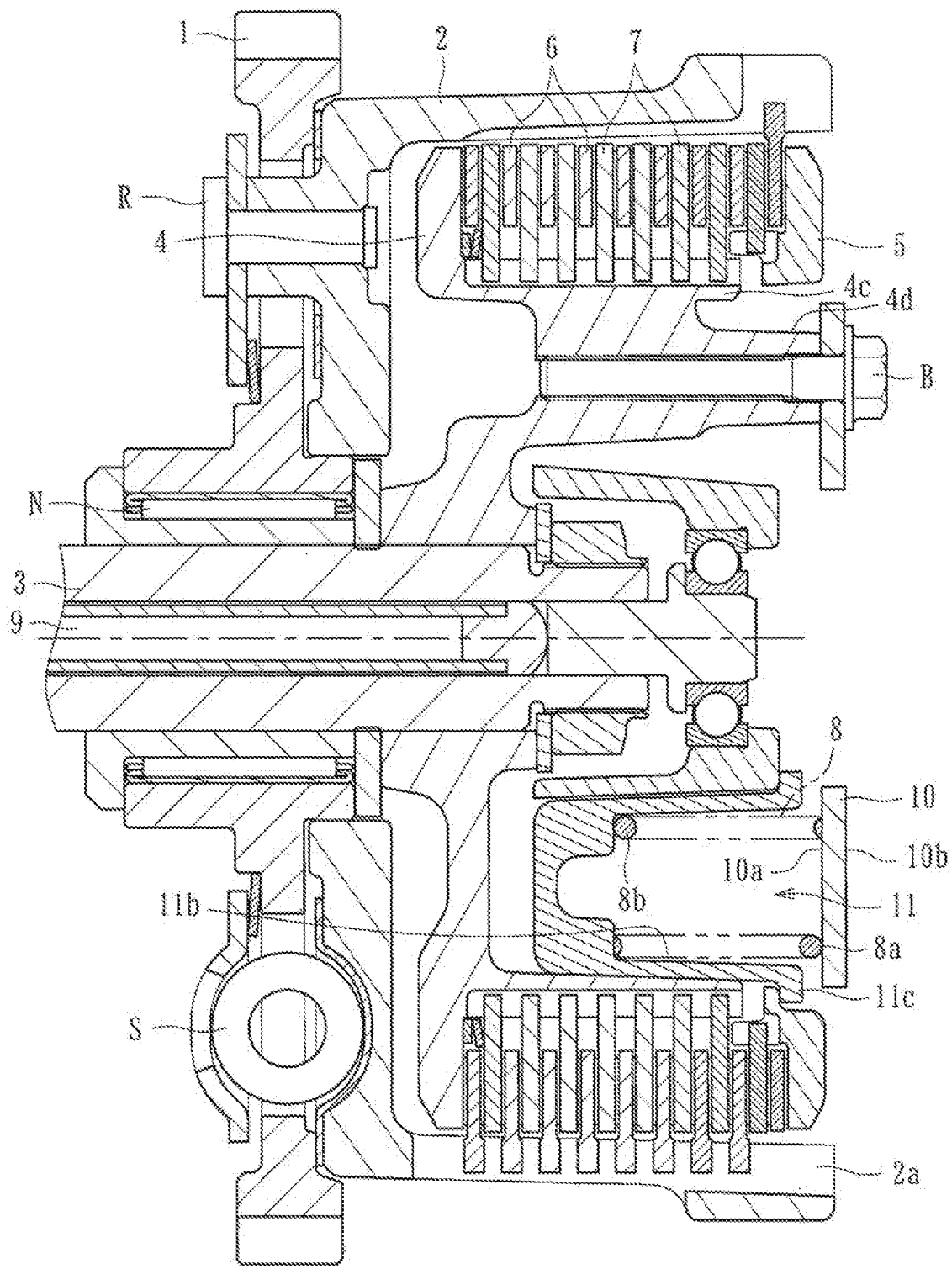

[Fig. 18]
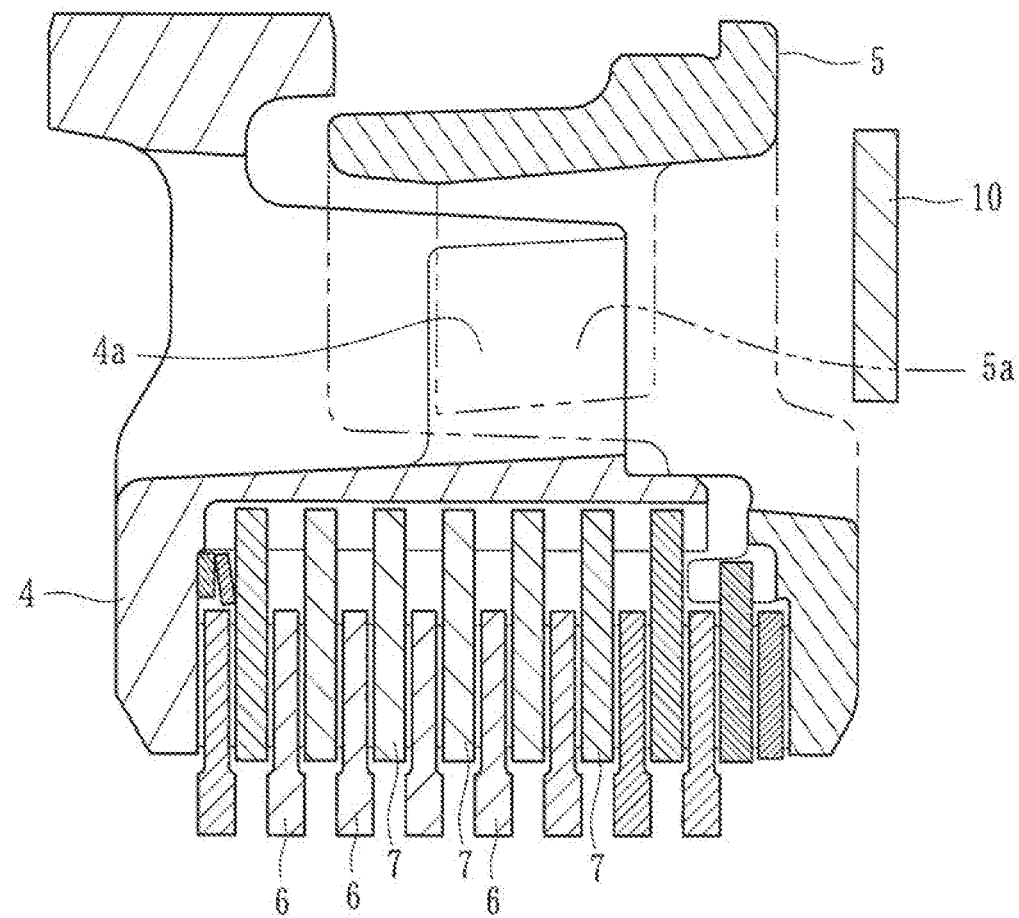

[Fig. 19]
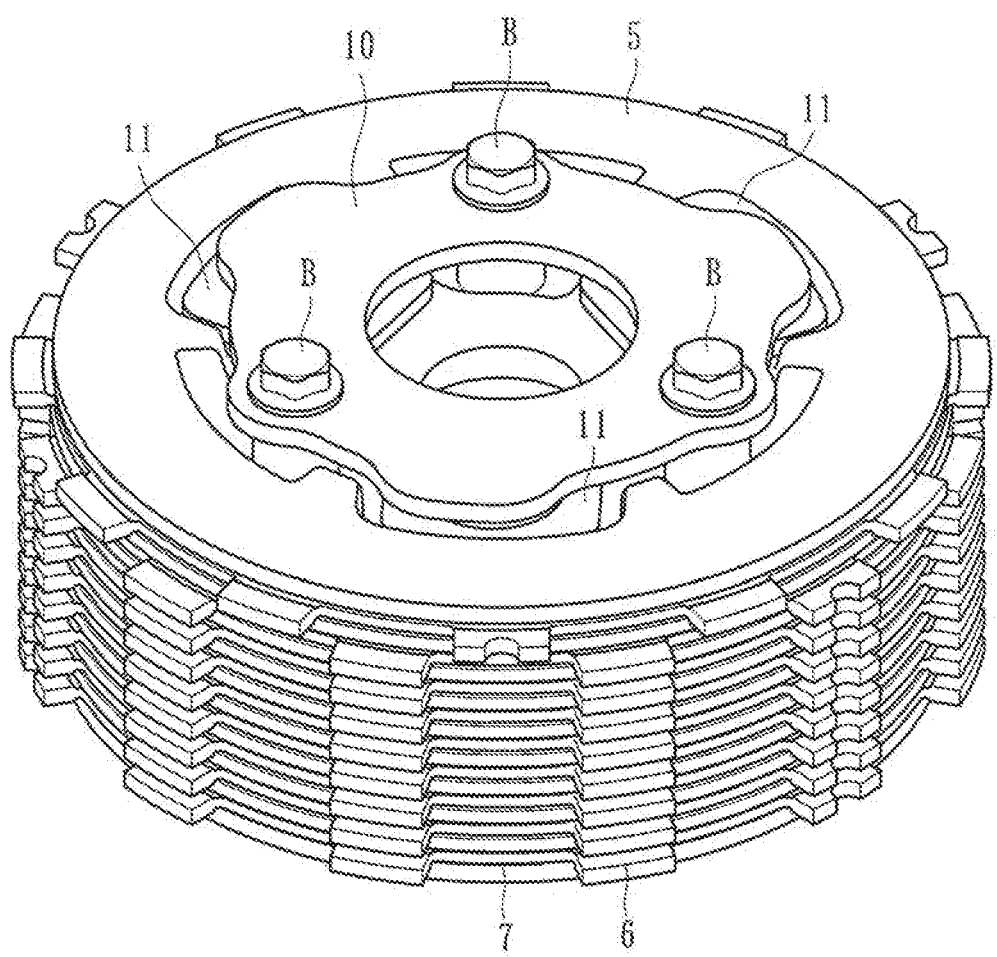

[Fig. 20]
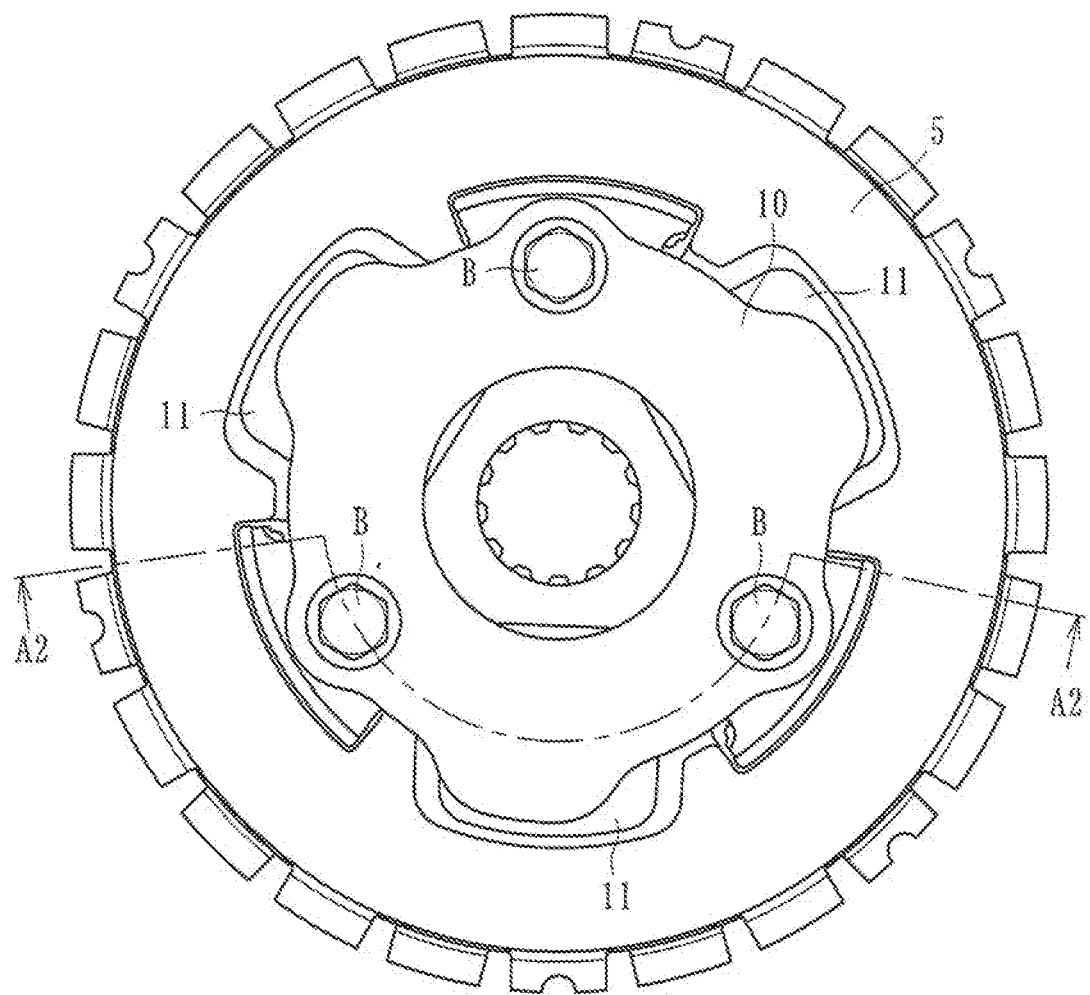

[Fig. 21]
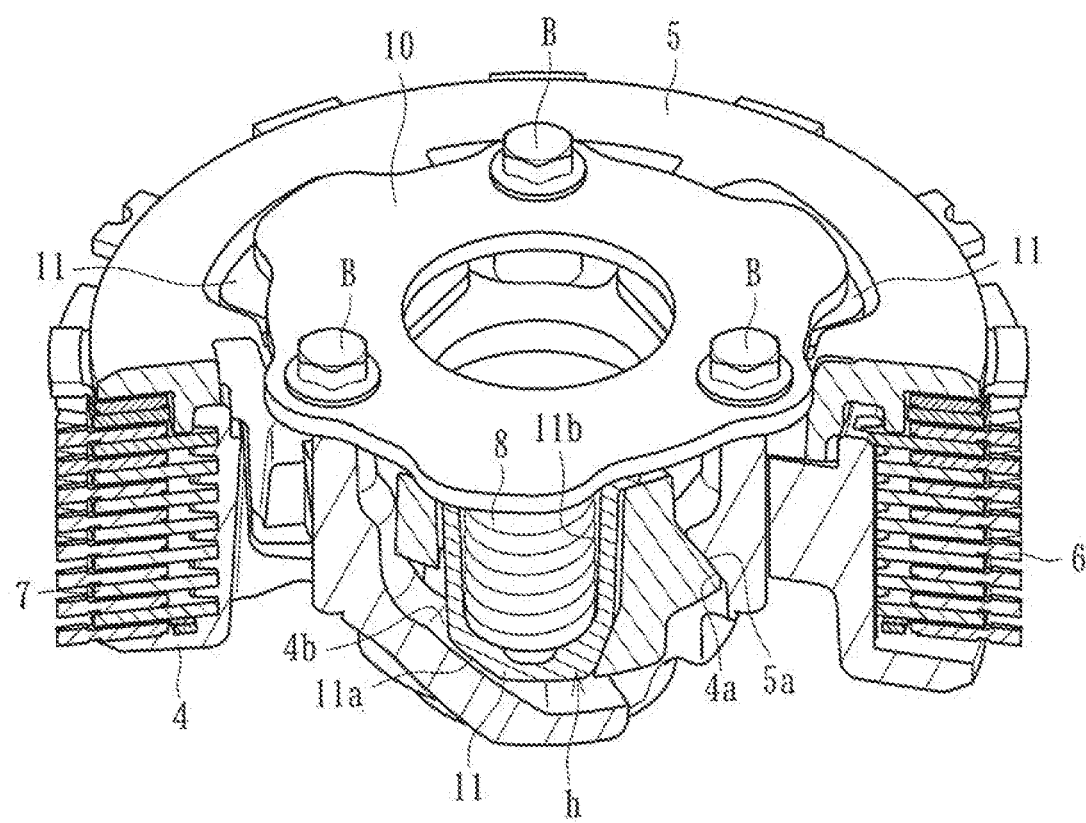

[Fig. 22]
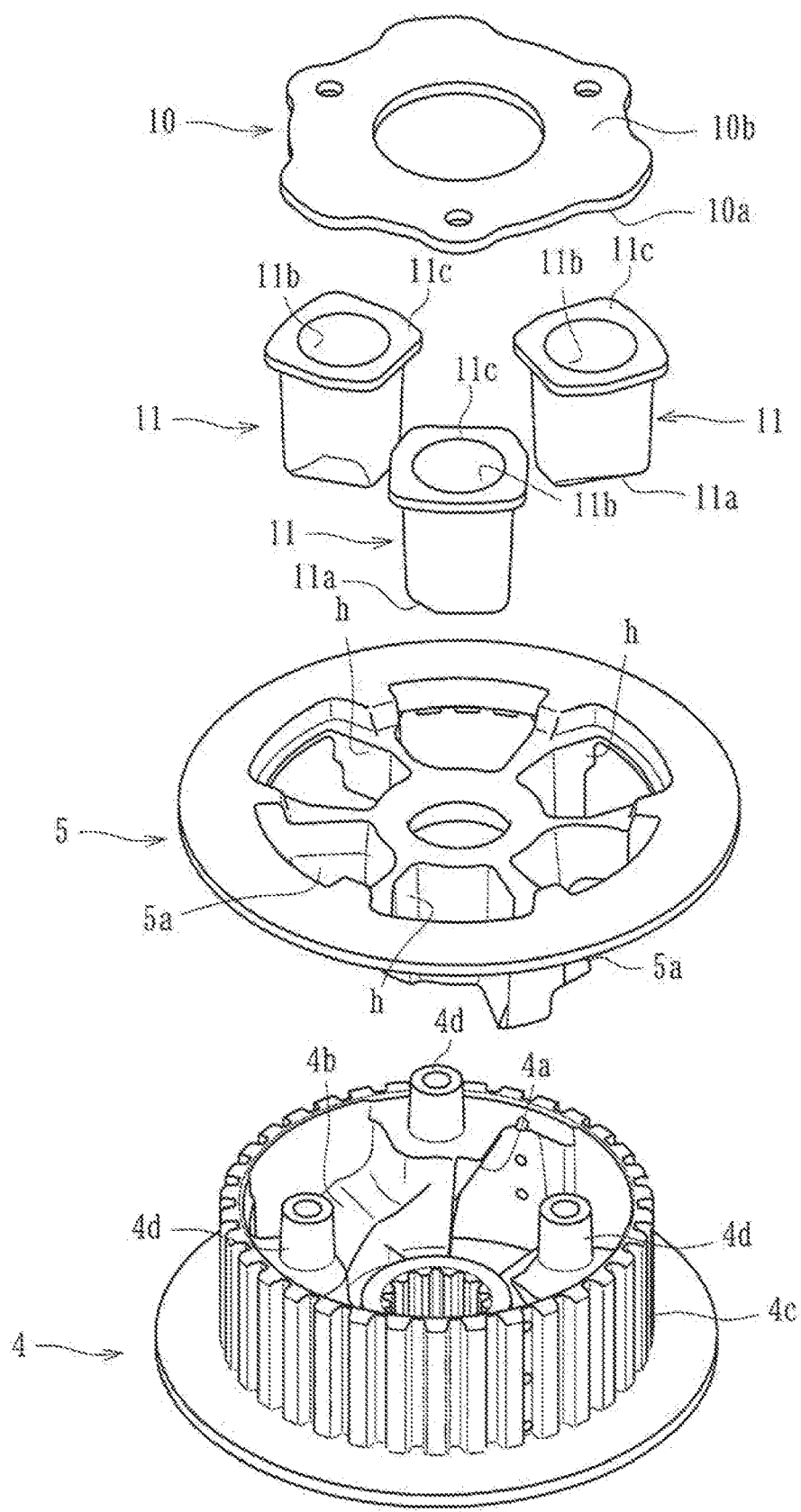

[Fig. 23]
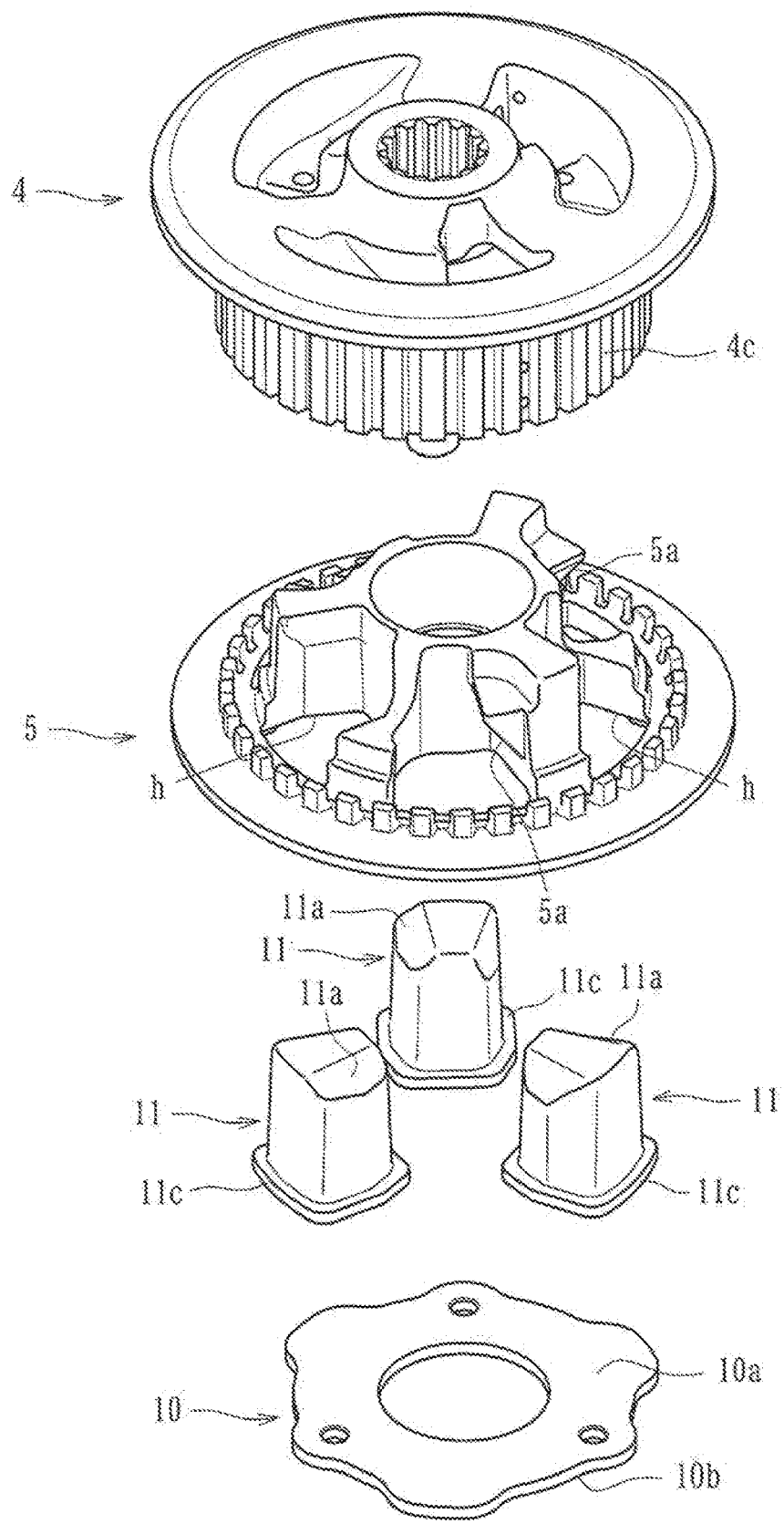

[Fig. 24]
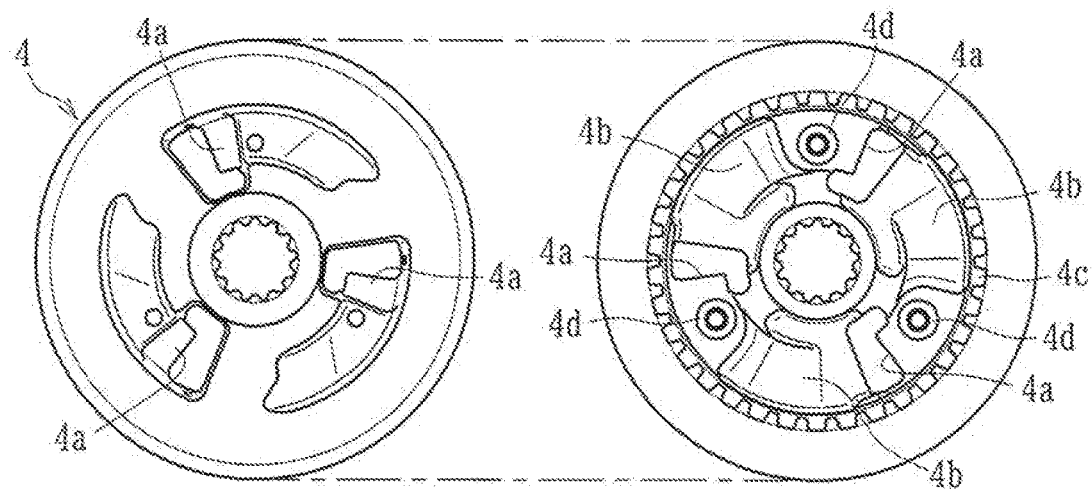
[Fig. 25]
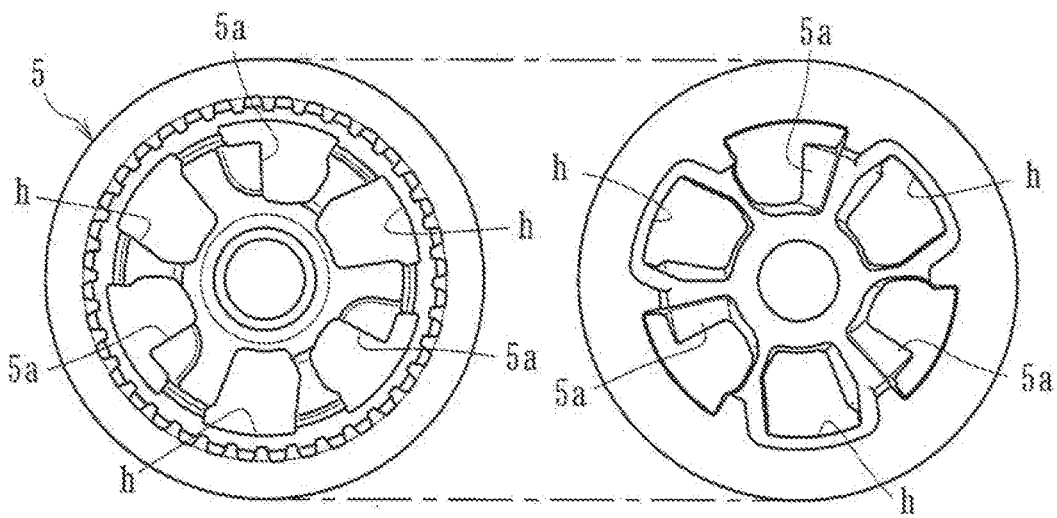
[Fig. 26]
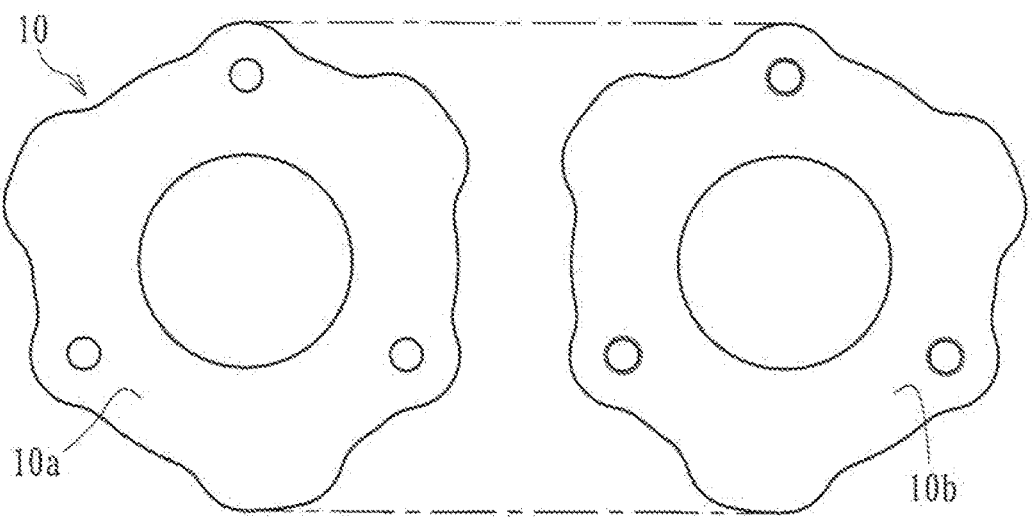

[Fig. 27]
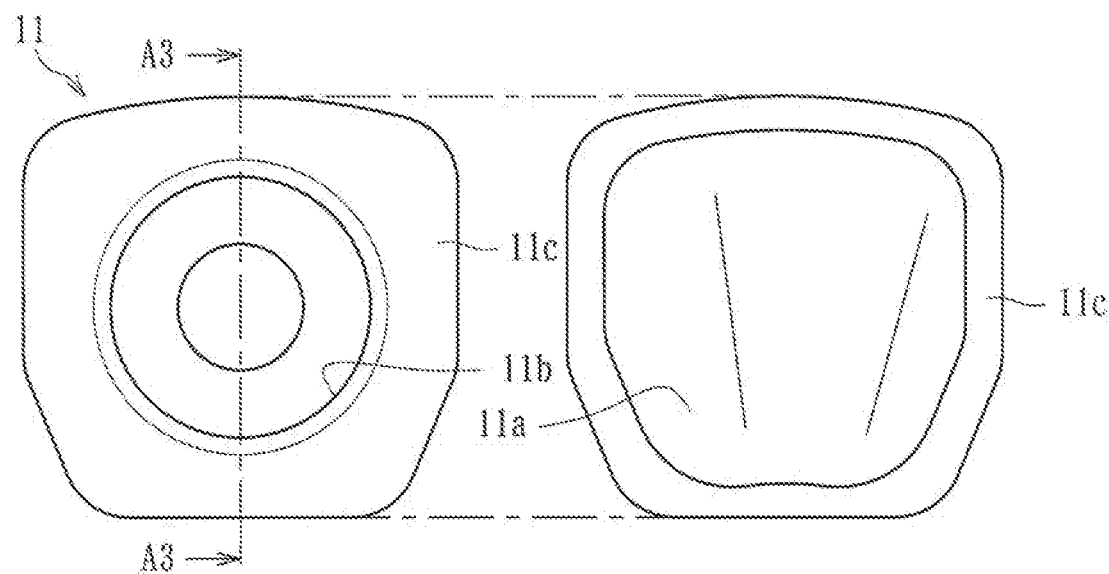
[Fig. 28]
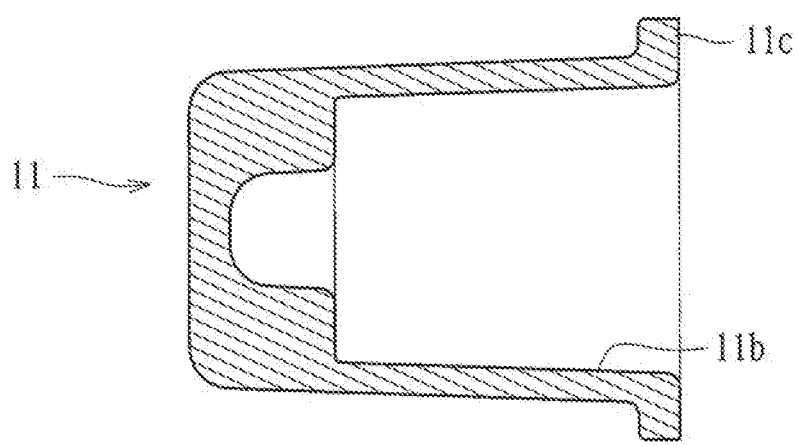

[Fig. 29]
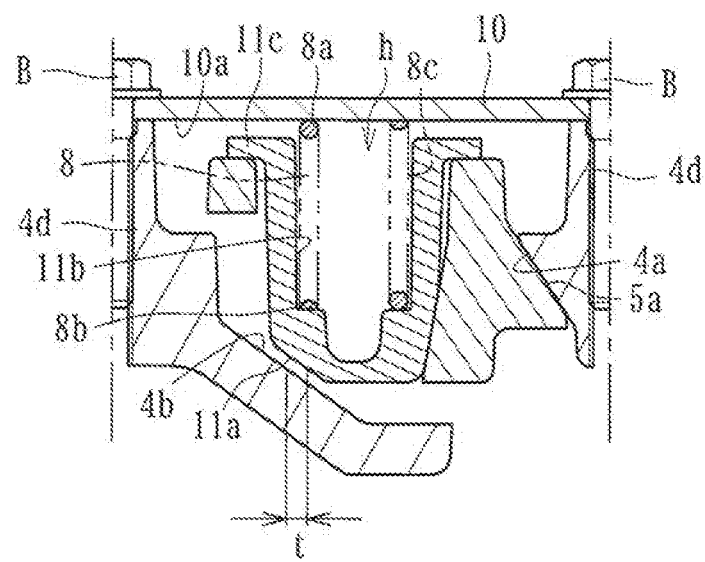
[Fig. 30]
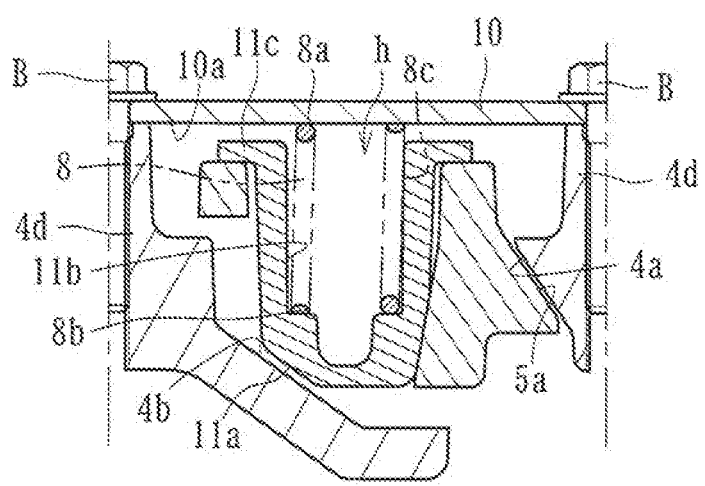
[Fig. 31]
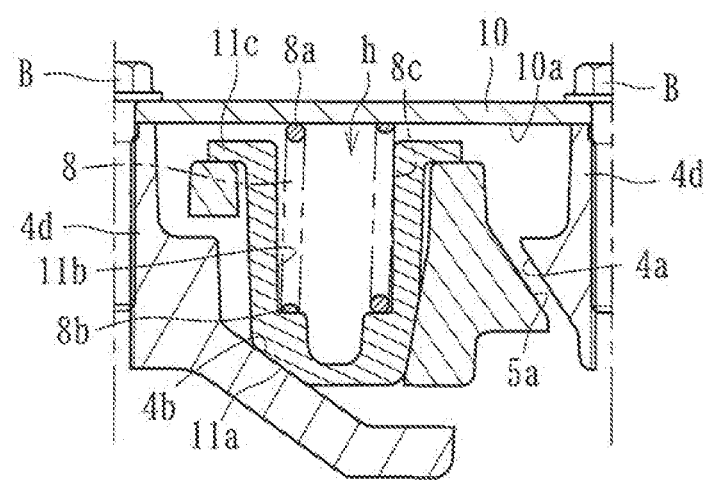

[Fig. 32]
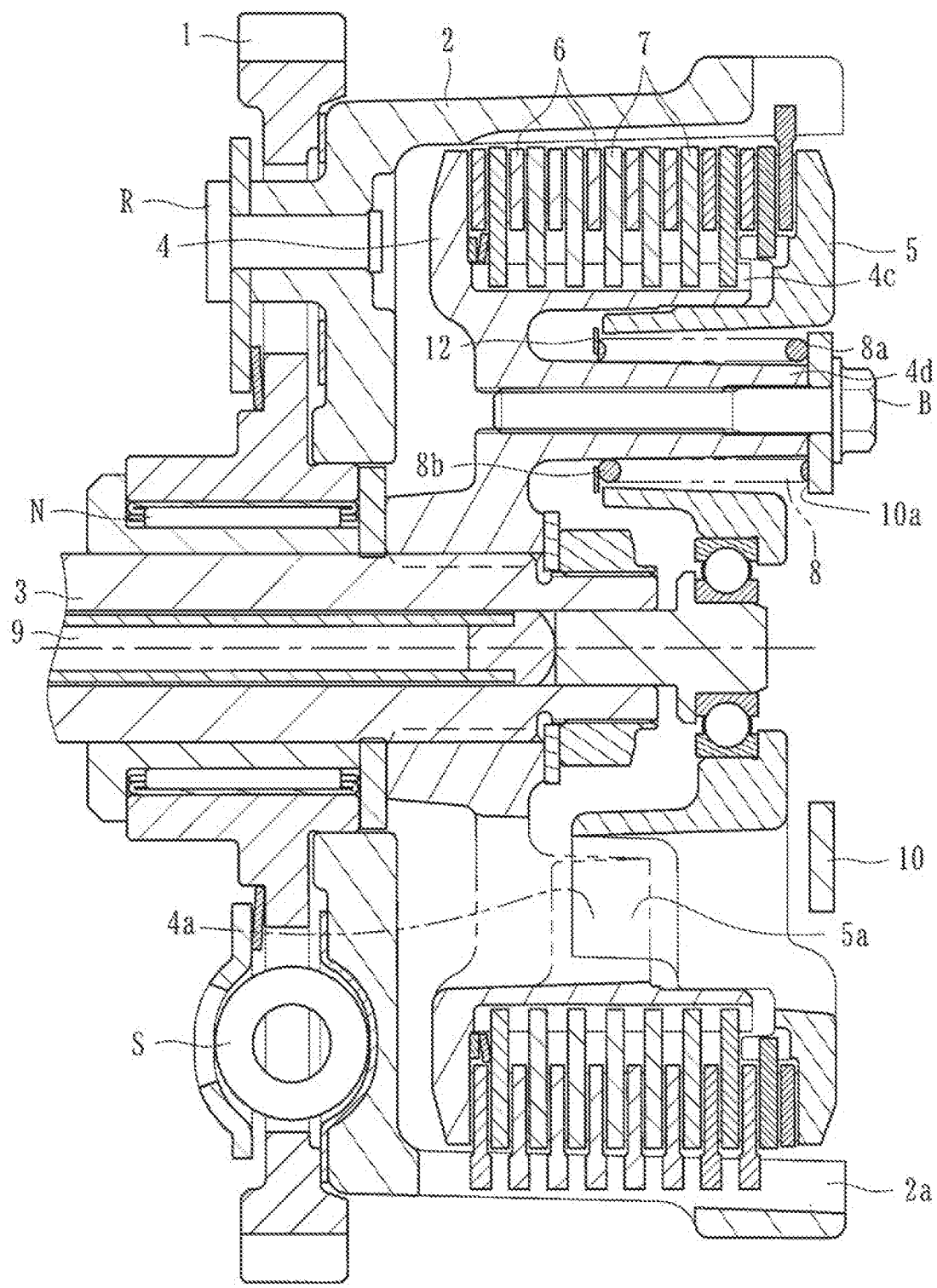

[Fig. 33]
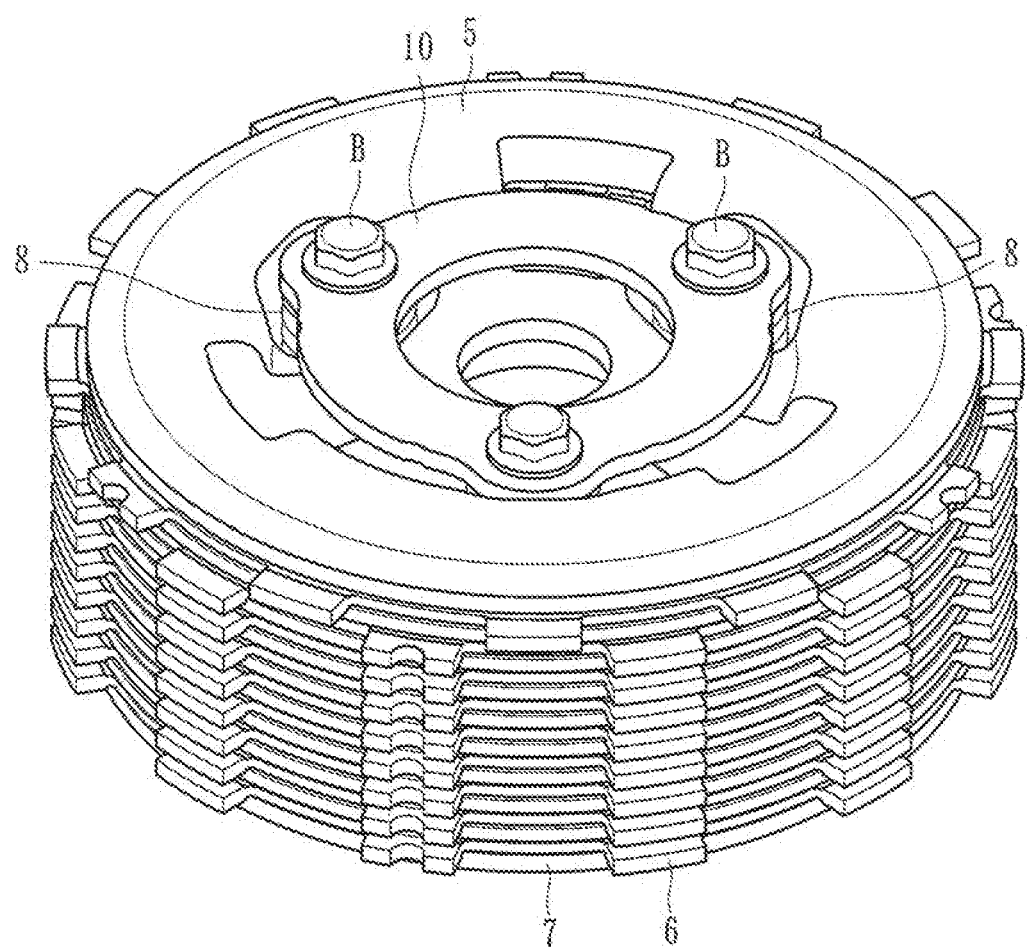

[Fig. 34]
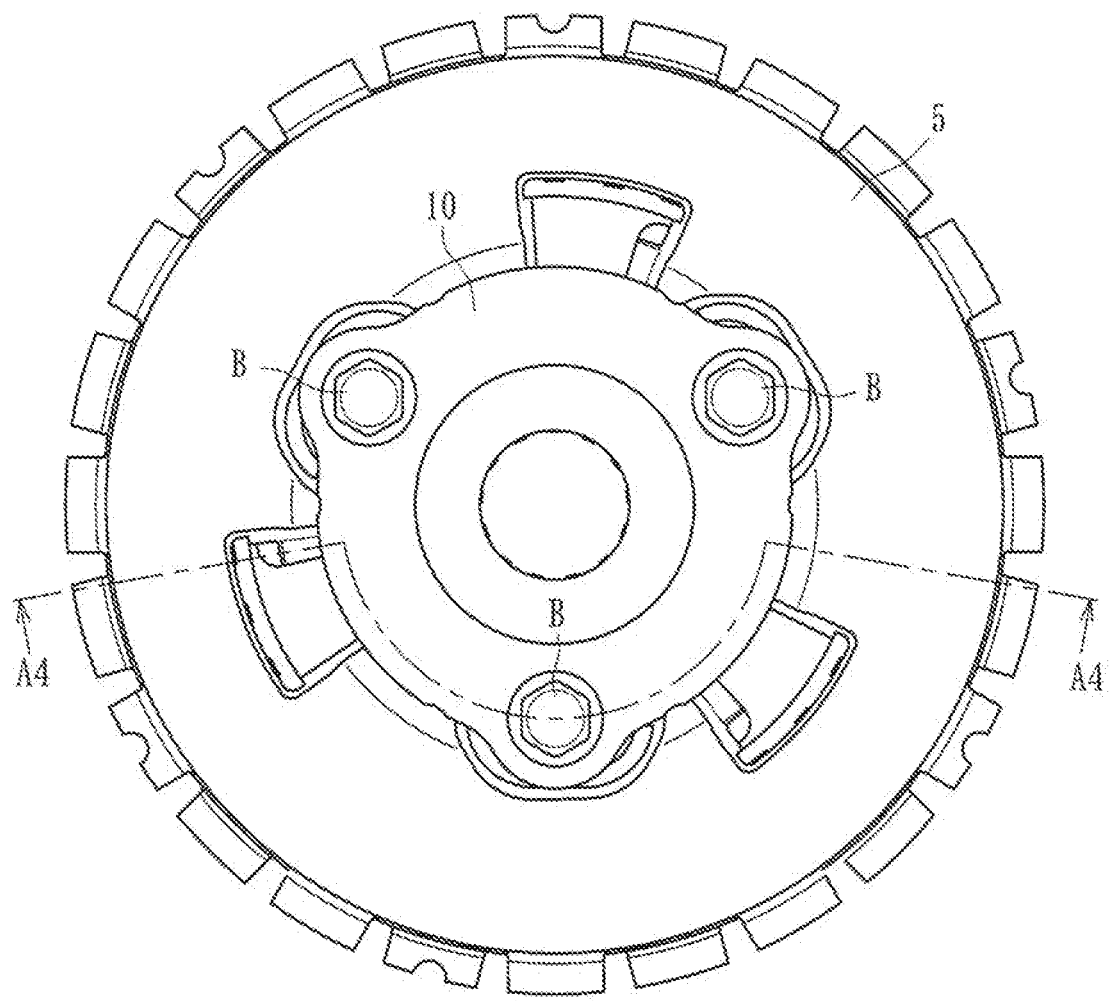

[Fig. 35]
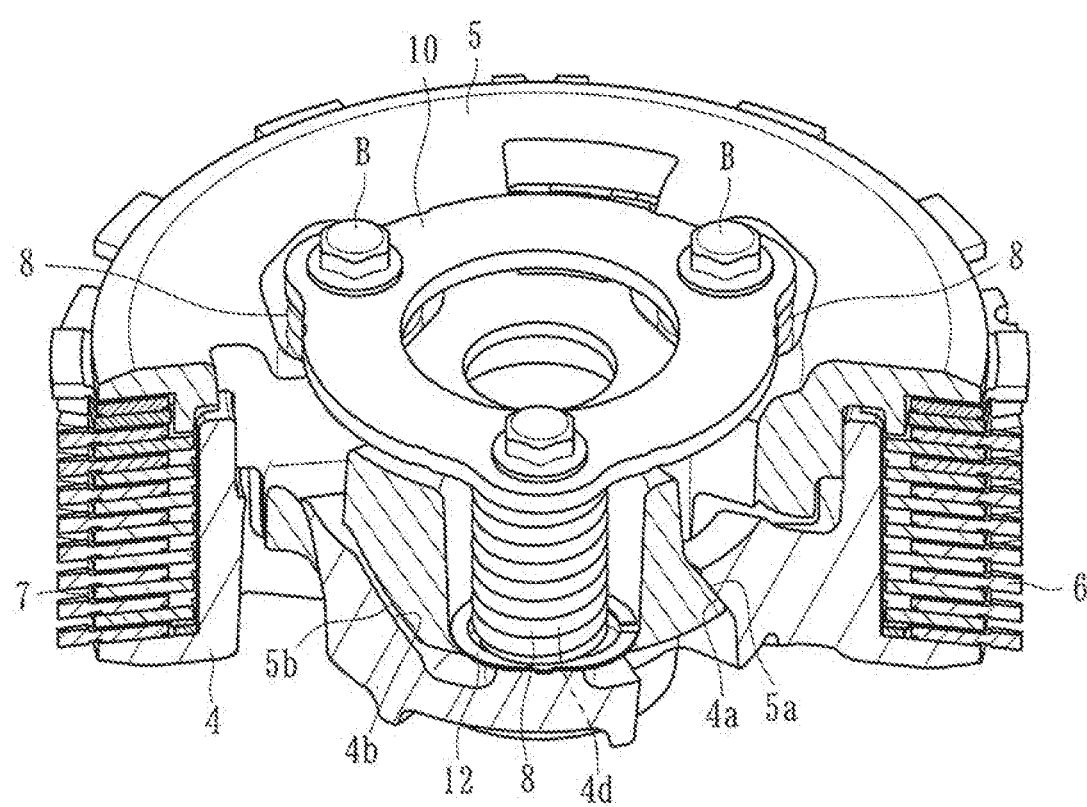

[Fig. 36]
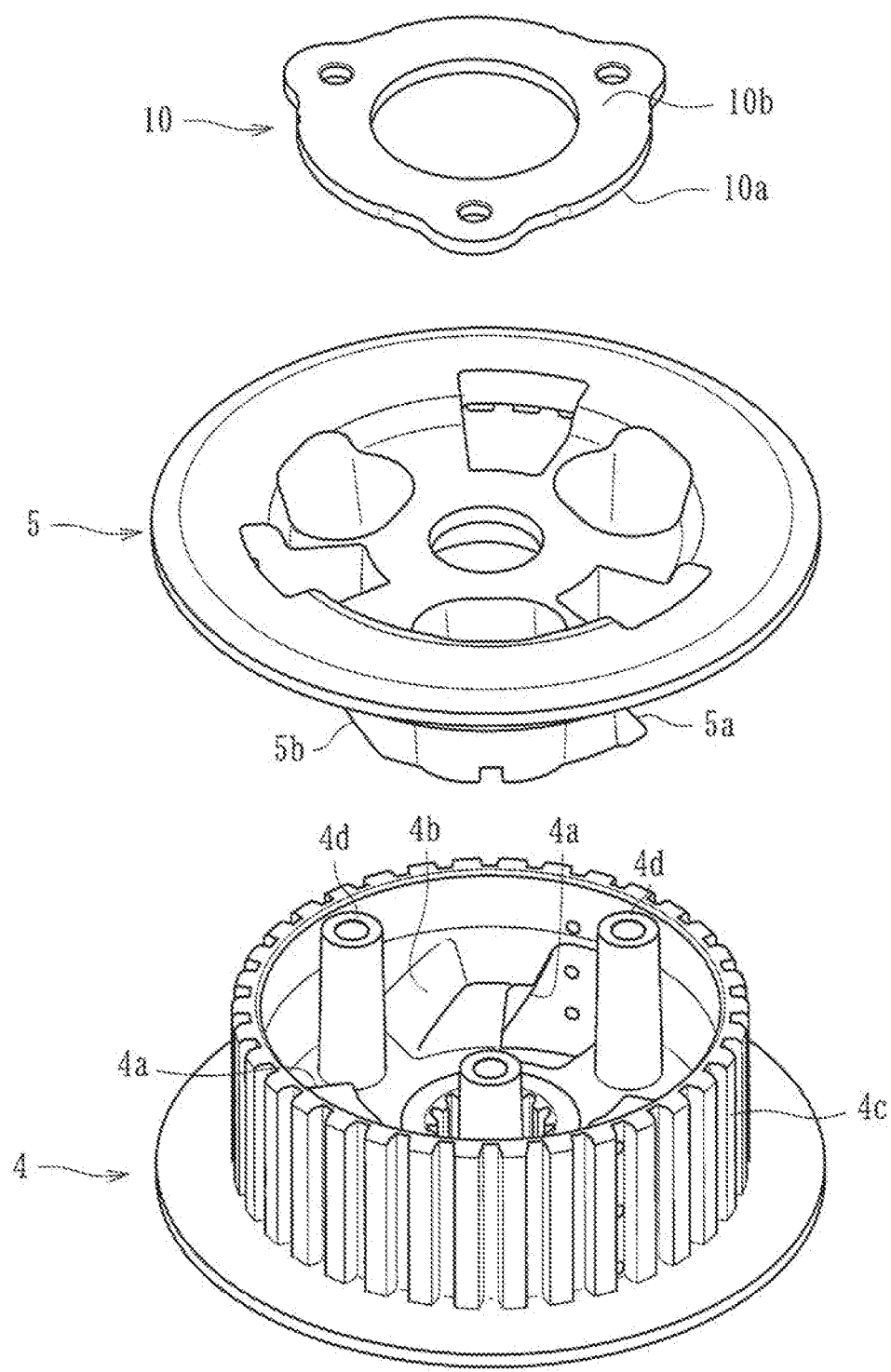

[Fig. 37]
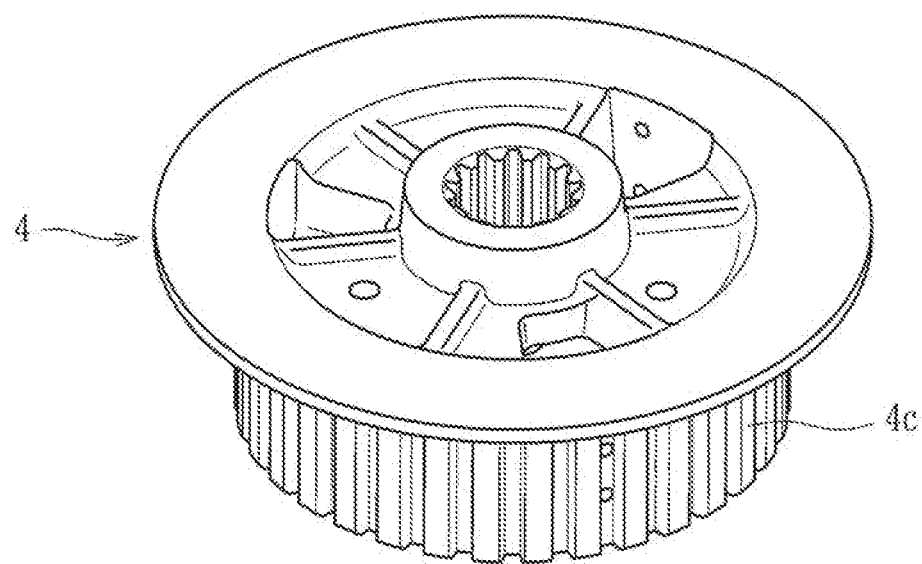
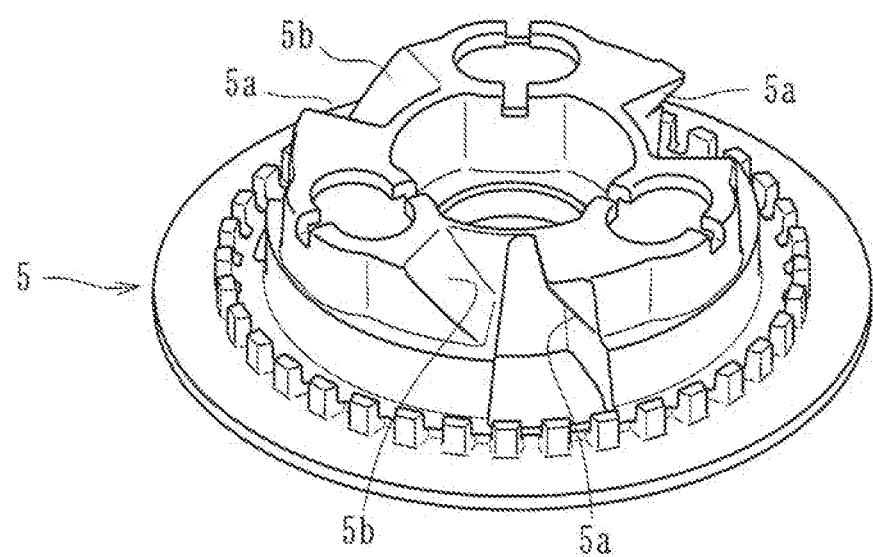
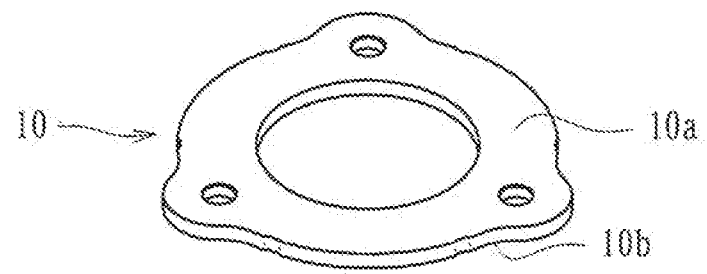

[Fig. 38]
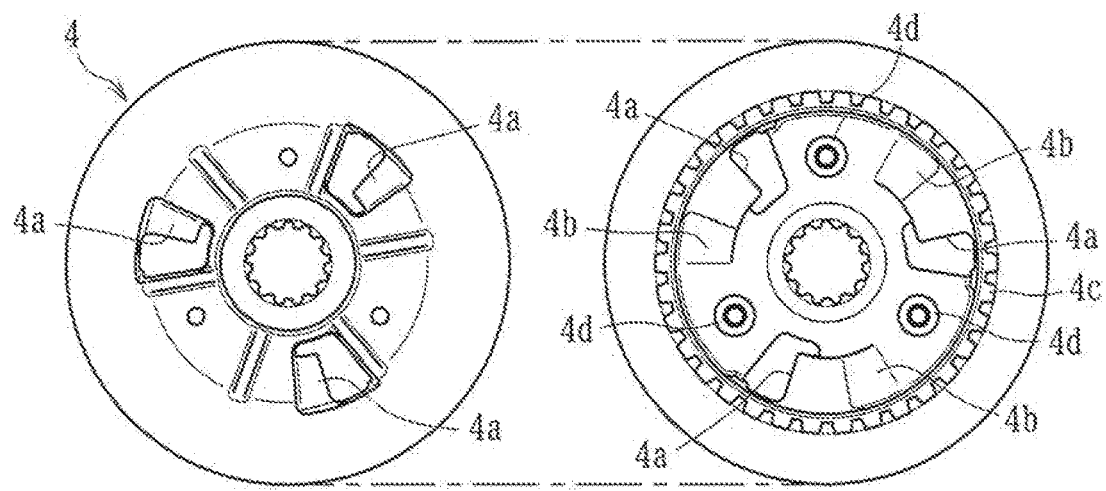
[Fig. 39]
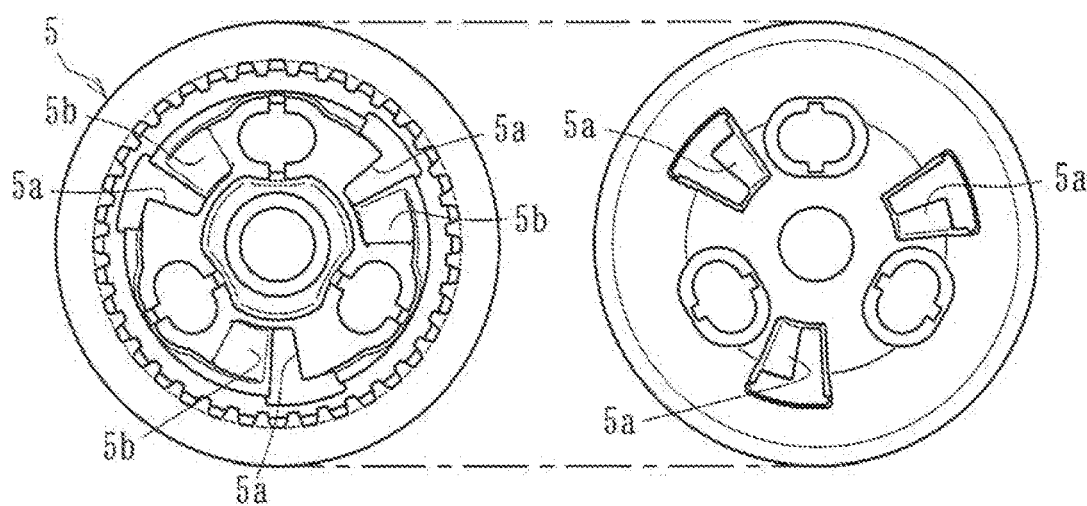
[Fig. 40]
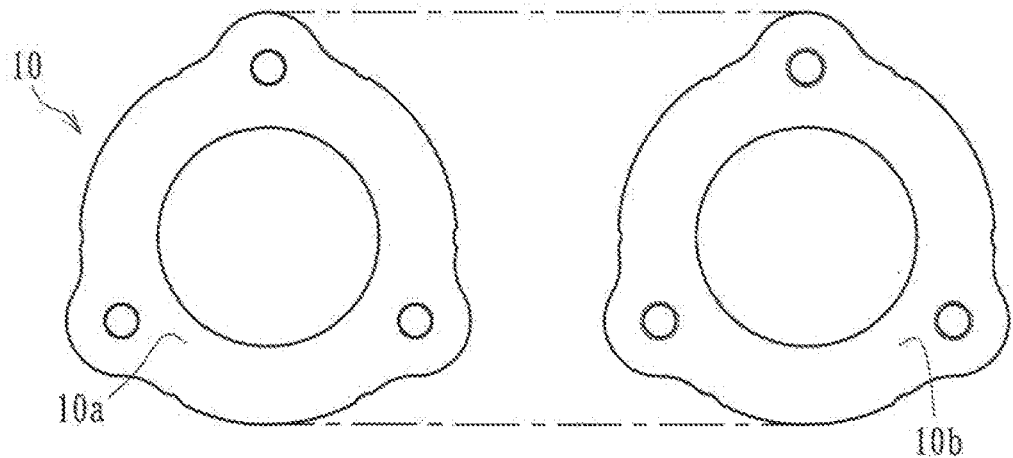

[Fig. 41]
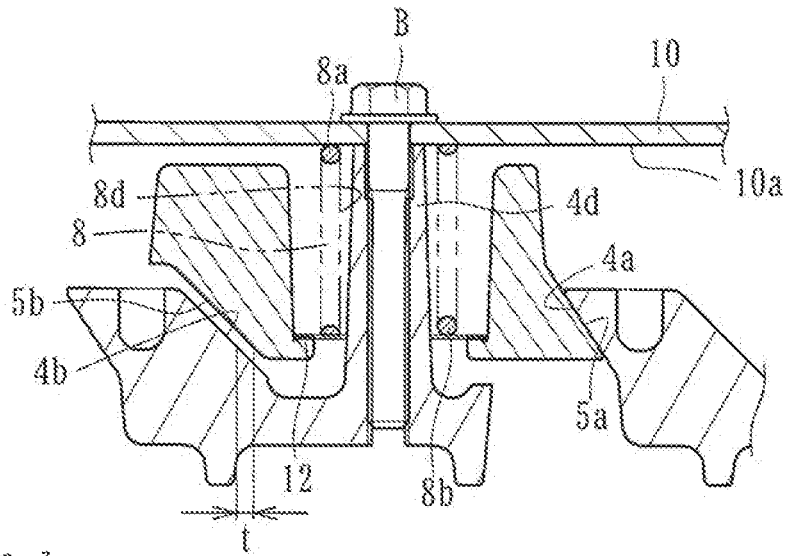
[Fig. 42]
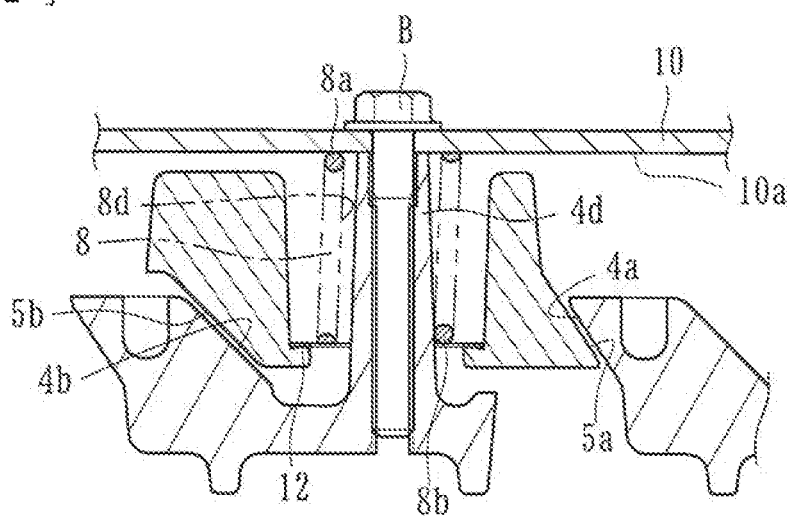
[Fig. 43]
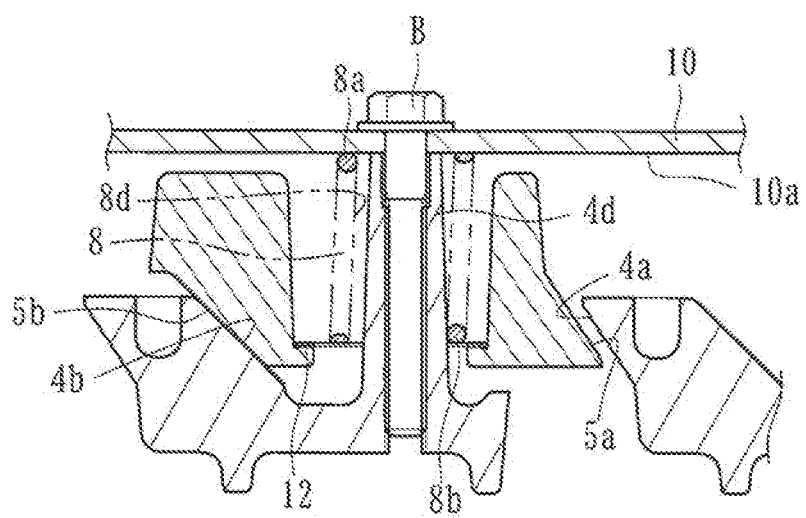

POWER TRANSMITTING APPARATUS

CROSS-REFERENCE TO RELATED APPLICATIONS

This application is a continuation of International Application No. PCT/JP2018/028052, filed Jul. 26, 2018, which claims priority to Japanese Application No. 2017-145838, filed Jul. 27, 2017. The disclosures of the above applications are incorporating herein by reference.

FIELD

The present disclosure relates to a power transmitting device that can, as desired, transmit rotational force of an input member to an output member or interrupt the rotational force.

BACKGROUND

In general, a power transmission device mounted on a motorcycle is intended to, as described, transmit the driving power of an engine to a transmission and a driving wheel or interrupt the driving power. The device includes an input member, an output member and a clutch member. The input member is coupled toward the engine. The output member is coupled toward the transmission and the driving wheel. The clutch member is coupled to the output member. Power is transmitted by bringing a plurality of driving-side clutch discs and driven-side clutch discs into a press-contact. The transmission power is interrupted by releasing the press-contact force.

More specifically, as disclosed in, e.g. Japanese Unexamined Patent Application Publication No. 2013-137039, a prior-art power transmission device includes a clutch housing. The clutch housing rotates with an input member and includes a plurality of driving-side clutch discs. A plurality of driven-side clutch discs are arranged alternately with the driving-side clutch discs of the clutch housing. A clutch member is coupled to an output member. A pressure member is attached to the clutch member. The pressure member moves in an axial direction of the clutch member. With the axial movement relative to the clutch member, the pressure member brings the driving-side clutch discs and the driven-side clutch discs into press-contact or it releases the press-contact force. The prior-art power transmission device is structured to be capable of transmitting the rotational force input to the input member to the output member or interrupting the rotational force by bringing the driving-side clutch discs and the driven-side clutch discs into press-contact or releasing the press-contact force.

Further, a press-contact assisting cam and a back-torque limiting cam are provided in the prior-art power transmission device. The press-contact assisting cam can increase the press-contact force of the driving-side clutch discs and the driven-side clutch discs when the pressure member and the clutch member relatively rotate to move closer to each other. Thus, a state is established where the rotational force input to the input member can be transmitted to the output member. The back-torque limiting cam releases the press-contact force of the driving-side clutch discs and the driven-side clutch discs when the pressure member and the clutch member relatively rotate to move away from each other. This occurs if the rotational speed of the output member exceeds the rotational speed of the input member.

Further, the prior-art power transmission device includes a resistant member made of a rubber material or the like. It is for generating sliding resistance against the pressure member when the pressure member rotates relative to the clutch member. Accordingly, the resistant member can generate rotational resistance when the pressure member and the clutch member relatively rotate because of clearance caused between cam surfaces of the press-contact assisting cam or the back-torque limiting cam. Thus, impact or hitting noise accompanied when the cam surfaces abut on each other can be suppressed.

SUMMARY

The prior-art power transmission device includes a resistant member made of a rubber material or the like. It generates sliding resistance against the pressure member when the pressure member rotates relative to the clutch member. This involves the problem of increasing the number of components and the need for frequent maintenance. This is caused by the rubber material being considerably worn.

Therefore, the present applicant has focused attention on a clutch spring for adding urging force in an axial direction to a pressure member. Also, the clutch spring is utilized to generate rotational resistance when the pressure member rotates relative to the clutch member. That is, utilization of a clutch spring adds urging force in an axial direction to a pressure member. Also, it generates sliding resistance in a rotational direction suitable for the axial urging force. Further, it generates rotational resistance in the rotational direction accurately and easily without employing any other dedicated component of a rubber material or the like.

The present disclosure provides a power transmission device that can add rotational resistance to the rotation of a pressure member relative to a clutch member by using a clutch spring. This suppresses accompanying impact or hitting noise when cam surfaces of a press-contact assisting cam or a back torque limiting cam abut on each other without employing any other dedicated member.

According to the disclosure, a power transmission device comprises a clutch housing that rotates with an input member. A plurality of driving-side clutch discs are attached to the clutch housing. A clutch member includes a plurality of driven-side clutch discs. The clutch member is coupled to an output member. The driven-side clutch discs are arranged alternately with the driving-side clutch discs of the clutch housing. A pressure member is attached to the clutch member. The pressure member moves in an axial direction of the clutch member. The pressure member, with movement in the axial direction relative to the clutch member, is capable of bringing the driving-side clutch discs and the driven-side clutch discs into press-contact or releasing the press-contact force. A restricting member is attached to the clutch member. The restricting member is capable of restricting movement of the pressure member away from the clutch member by a predetermined dimension. A clutch spring is attached to the restricting member by one end of the clutch spring abutting on a surface of the restricting member. This adds urging force to the pressure member in a direction where the driving-side clutch discs and the driven-side clutch discs are brought into the press-contact. A press-contact assisting cam or a back-torque limiting cam is included. The press-contact assisting cam is capable of increasing the press-contact force of the driving-side clutch discs and the driven-side clutch discs when the pressure member and the clutch member relatively rotate to move closer to each other. Thus, a state is established where rotational force input to the input member is transmittable to the output member. The back-torque limiting cam releasing the press-contact force of the driving-side clutch discs and the driven-side clutch discs when the pressure member and the clutch member relatively rotate to move away from each other. Thus, a rotational speed of the output member exceeds a rotational speed of the input member. The power transmission device is capable of transmitting the rotational force input to the input member to the output member or interrupting the rotational force. This occurs by the press-contact of the driving-side clutch discs and the driven-side clutch discs or the releasing of the press-contact force. In the power transmission device, when the pressure member rotates relative to the clutch member, because of clearance between cam surfaces of the press-contact assisting cam or the back torque limiting cam, the clutch spring is capable of generating rotational resistance. This occurs by one end or the other end sliding on a surface of the restricting member or a spring seat, that constitutes a seat surface of the clutch spring, while a side surface is held in a longitudinal direction.

According to the disclosure, the clutch spring is accommodated and attached in a depressed portion provided in the pressure member. When the pressure member rotates relative to the clutch member, because of the press-contact assisting cam or the back torque limiting cam, the one end of the clutch spring slides on a surface of the restricting member while an outer circumferential side surface of the clutch spring in the longitudinal direction, abuts the depressed portion. It is held on an inner circumferential wall surface of the depressed portion.

According to the disclosure, the clutch spring is accommodated and attached in an accommodating member attached to the pressure member. When the pressure member rotates relative to the clutch member, because of the press-contact assisting cam or the back torque limiting cam, the one end of the clutch spring slides on a surface of the restricting member while an outer circumferential side surface of the clutch spring, in the longitudinal direction, abuts the accommodating member. It is held on an inner circumferential wall surface of the accommodating member.

According to the disclosure, the clutch spring is inserted and attached in a boss portion provided in the clutch member. When the pressure member rotates relative to the clutch member, because of the press-contact assisting cam or the back torque limiting cam, the other end of the clutch spring slides on the surface of the spring seat while an inner circumferential side surface of the clutch spring in the longitudinal direction, abuts the boss portion. It is held on an outer circumferential surface of the boss portion.

According to the disclosure, the restricting member or the spring seat is formed by hardening a sliding surface. At least the one end or the other end of the clutch spring slides on the hardened sliding surface.

According to the disclosure, when a pressure member rotates relative to a clutch member, because of clearance between cam surfaces of a press-contact assisting cam or a back torque limiting cam, a clutch spring can generate rotational resistance by one end or the other end of the spring sliding on a surface of a restricting member or a spring seat. This constitutes a seat surface for the clutch spring while a side surface of the spring is held in a longitudinal direction. Accordingly, rotational resistance can be added to the rotation of the pressure member relative to the clutch member by using the clutch spring. Thus, accompanying impact or hitting noise can be suppressed when the cam surfaces of the press-contact assisting cam or the back torque limiting cam abut on each other. This occurs without employing any other dedicated member.

According to the disclosure, the clutch spring is accommodated and attached in a depressed portion provided in the pressure member. When the pressure member rotates relative to the clutch member, because of the press-contact assisting cam or the back torque limiting cam, one end of the spring can slide on a surface of the restricting member while an outer circumferential side surface of the spring in the longitudinal direction, abuts the depressed portion. It is held on an inner circumferential wall surface of the depressed portion. Accordingly, the inner circumferential wall surface of the depressed portion can prevent the clutch spring from leaning or bending when rotational resistance is generated. Thus, the necessary rotational resistance can be generated with higher reliability.

According to the disclosure, the clutch spring is accommodated and attached in an accommodating member attached to the pressure member. When the pressure member rotates relative to the clutch member, because of the press-contact assisting cam or the back torque limiting cam, one end of the spring can slide on a surface of the restricting member while an outer circumferential side surface of the spring in the longitudinal direction, can abut the accommodating member. It is held on an inner circumferential wall surface of the accommodating member. Accordingly, the inner circumferential wall surface of the accommodating member can prevent the clutch spring from leaning or bending when rotational resistance is generated. Thus, the necessary rotational resistance can be generated with higher reliability.

According to the disclosure, the clutch spring is inserted and attached in a boss portion provided in the clutch member. When the pressure member rotates relative to the clutch member, because of the press-contact assisting cam or the back torque limiting cam, the other end of the spring can slide on a surface of the spring seat while an inner circumferential side surface of the spring, in the longitudinal direction abuts the boss portion. It is held on an outer circumferential surface of the boss portion. Accordingly, the outer circumferential surface of the boss portion can prevent the clutch spring from leaning or bending when rotational resistance is generated. Thus, the necessary rotational resistance can be generated with higher reliability.

According to the disclosure, the restricting member or the spring seat is formed by hardening a sliding surface. At least the one end or the other end of the clutch spring slides on the hardened surface. Thus, wearing of the sliding surface of the restricting member or the spring seat due to repeated sliding can be suppressed. Also, poor movement caused by the wearing can be prevented.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an overall longitudinal cross-sectional view illustrating a power transmission device according to a first embodiment.

FIG. 2 is a cross-sectional schematic diagram illustrating a clutch-member-side first cam surface and a pressuremember-side first cam surface that constitute a press-contact assisting cam in the power transmission device.

FIG. 3 is a perspective view illustrating a state where a pressure member is combined with a clutch member in the power transmission device.

FIG. 4 is a plan view illustrating a state where the pressure member is combined with the clutch member in the power transmission device.

FIG. 5 is a cross-sectional view along the line A1-A1 in FIG. 4.

FIG. 6 is a exploded perspective view illustrating the clutch member, the pressure member, and a restricting member in the power transmission device.

FIG. 7 is an exploded perspective view illustrating the clutch member, the pressure member, and the restricting member in the power transmission device.

FIG. 8 is a front plan view and a rear plan view illustrating the clutch member in the power transmission device.

FIG. 9 is a front plan view and a rear plan view illustrating the pressure member in the power transmission device.

FIG. 10 is a front plan view and a rear plan view illustrating the restricting member in the power transmission device.

FIG. 11 is a side elevation view and a front plan view illustrating a clutch spring in the power transmission device.

FIG. 12 is a cross-section schematic diagram illustrating the action of the press-contact assisting cam in the power transmission device.

FIG. 13 is a cross-section schematic diagram illustrating the action of a back torque limiting cam in the power transmission device.

FIG. 14 is a cross-sectional view illustrating a process (a state before sliding) where the clutch spring slides on a surface of the restricting member in the power transmission device.

FIG. 15 is a cross-sectional view illustrating the process (a state during the sliding) where the clutch spring slides on the surface of the restricting member in the power transmission device.

FIG. 16 is a cross-sectional view illustrating the process (a state after the sliding) where the clutch spring slides on the surface of the restricting member in the power transmission device.

FIG. 17 is an overall longitudinal cross-sectional view illustrating a power transmission device according to a second embodiment of the present disclosure.

FIG. 18 is a schematic cross-section diagram illustrating a clutch-member-side first cam surface and a pressure-member-side first cam surface that constitute a press-contact assisting cam in the power transmission device.

FIG. 19 is a perspective view illustrating a state where a pressure member is combined with a clutch member in the power transmission device.

FIG. 20 is a plan view illustrating a state where the pressure member is combined with the clutch member in the power transmission device.

FIG. 21 is a cross-sectional view along the line A2-A2 in FIG. 20.

FIG. 22 is an exploded perspective view illustrating the clutch member, the pressure member, a restricting member, and an accommodating member in the power transmission device.

FIG. 23 is an exploded perspective view illustrating the clutch member, the pressure member, the restricting member, and the accommodating member in the power transmission device.

FIG. 24 is a front plan view and a rear plan view illustrating the clutch member in the power transmission device.

FIG. 25 is a front plan view and a rear plan view illustrating the pressure member in the power transmission device.

FIG. 26 is a front plan view and a rear plan view illustrating the restricting member in the power transmission device.

FIG. 27 is a front plan view and a rear plan view illustrating the accommodating member in the power transmission device.

FIG. 28 is a cross-sectional view along the line A3-A3 in FIG. 27.

FIG. 29 is a cross-sectional view illustrating a process (a state before sliding) where a clutch spring slides on a surface of the restricting member in the power transmission device.

FIG. 30 is a cross-sectional view illustrating the process (a state during the sliding) where the clutch spring slides on the surface of the restricting member in the power transmission device.

FIG. 31 is a cross-sectional view illustrating the process (a state after the sliding) where the clutch spring slides on the surface of the restricting member in the power transmission device.

FIG. 32 is an overall longitudinal cross-sectional view illustrating a power transmission device according to a third embodiment of the present disclosure.

FIG. 33 is a perspective view illustrating a state where a pressure member is combined with a clutch member in the power transmission device.

FIG. 34 is a plan view illustrating a state where the pressure member is combined with the clutch member in the power transmission device.

FIG. 35 is a cross-sectional view along the line A4-A4 in FIG. 34.

FIG. 36 is an exploded perspective view illustrating the clutch member, the pressure member, and a restricting member in the power transmission device.

FIG. 37 is an exploded perspective view illustrating the clutch member, the pressure member, and the restricting member in the power transmission device.

FIG. 38 is a front plan view and a rear plan view illustrating the clutch member in the power transmission device.

FIG. 39 is a front plan view and a rear plan view illustrating the pressure member in the power transmission device.

FIG. 40 is a front plan view and a rear plan view illustrating the restricting member in the power transmission device.

FIG. 41 is a cross-sectional view illustrating a process (a state before sliding) where a clutch spring slides on a surface of the restricting member in the power transmission device.

FIG. 42 is a cross-sectional view illustrating the process (a state during the sliding) where the clutch spring slides on the surface of the restricting member in the power transmission device.

FIG. 43 is a cross-sectional view illustrating the process (a state after the sliding) where the clutch spring slides on the surface of the restricting member in the power transmission device.

DETAILED DESCRIPTION

Embodiments of the present disclosure are specifically described below with reference to the drawings.

A power transmission device according to a first embodiment, that is obtainable by die casting, is arranged in a vehicle, such as a two-wheel vehicle. The power transmission device, as desired, transmits the driving power of an engine toward a transmission and a driving wheel or interrupt the driving power. As illustrated in FIGS. 1 to 11, the power transmission device includes a clutch housing 2. A gear 1, as an input member, is coupled with the clutch housing 2. A clutch member 4 is coupled to a shaft 3 as an output member. A pressure member 5 is provided on the right end side of the clutch member 4 in FIG. 1. Driving-side clutch discs 6 are coupled toward the clutch housing 2. Driven-side clutch discs 7 are coupled toward the clutch member 4. Clutch-member-side first cam surfaces 4a and clutch-member-side second cam surfaces 4b are included in the clutch member 4. Pressure-member-side first cam surfaces 5a and pressure-member-side second cam surfaces 5b are included in the pressure member 5. The device includes clutch springs 8 and a restricting member 10. In the drawings, each reference character "S" denotes a damper and each reference character "N" denotes a needle bearing.

The gear 1 is enabled to rotate about the shaft 3 if the driving force (rotational force) transmitted from the engine is input into the gear 1. The gear 1 is coupled to the clutch housing 2 with a rivet R or the like. The clutch housing 2 has a case member like a cylinder that is opened on its right end side in FIG. 1. In the inner circumferential wall of the clutch housing 2, a spline (a spline fitting portion 2a) is provided. The plurality of driving-side clutch discs 6 are attached to the spline fitting portion 2a. Each of the driving-side clutch discs 6 is made of a board material formed like an approximately annular ring. Each disc 6 is structured to be capable of rotating with the clutch housing 2 and sliding in the axial direction (the left-right direction in FIG. 1) by being fitted in the spline fitting portion 2a. It is provided in the inner circumferential surface of the clutch housing 2.

A member provided in the clutch housing 2 constitutes the clutch member 4. The shaft 3, as an output member, passes in an approximately central portion of the clutch member 4. The clutch member 4 and the shaft 3 are coupled to each other by spline fittings. They are structured so that if the clutch member 4 rotates, the shaft 3 rotates as well. As illustrated in FIGS. 6 and 7, a spline (a spline fitting portion 4c) extends in the axial direction (the up-down direction in FIGS. 6 and 7). It is provided in the outer circumferential side surface of the clutch member 4. The driven-side clutch discs 7 are fitted in and attached to the spline fitting portion 4.

More specifically, as illustrated in FIGS. 6 and 7, the spline (the spline fitting portion 4c), provided in the clutch member 4, is structured to have an uneven shape that is integrally formed in the outer circumferential side surface of the clutch member 4. It is approximately positioned all around the circumference. It is structured so that the driven-side clutch discs 7 fit in the depressed grooves that constitute the spline. Movement of the driven-side clutch discs 7, in the rotational direction, is restricted. The discs 7 axial movement relative to the clutch member 4 is allowed. Thus, rotation with the clutch member 4 is enabled.

The driven-side clutch discs 7 and the driving-side clutch discs 6 are alternately arranged to be stacked. Each clutch disc 6 and each clutch disc 7, that are adjacent one another, are brought into press-contact or the press-contact force is released. That is, both the clutch discs 6 and the clutch discs 7 are allowed to slide in the axial direction of the clutch member 4. When pressed by the pressure member 5 in the leftward direction in FIG. 1, the discs 6, 7 are brought into press-contact and the rotational force of the clutch housing 2 becomes transmittable to the shaft 3 through the clutch member 4. When the pressure member 5 cancels the pressing, the press-contact force is released. Thus, the clutch member 4 stops following the rotation of the clutch housing 2 and halts. Thus, the transmission of the rotational force to the shaft 3 is stopped.

The pressure member 5 is attached in a position on the right end side of the clutch member 4 in FIG. 1. The pressure member 5, with the axial movement relative to the clutch member 4, moves in the axial direction (the left-right direction in FIG. 1) of the clutch member 4 and can bring the driving-side clutch discs 6 and the driven-side clutch discs 7 into press-contact or release the press-contact force. More specifically, the pressure member 5 is normally urged by the clutch spring 8 in the leftward direction in FIG. 1. A push rod 9, provided in the shaft, extends in its axial direction. The push rod 9 can be caused to project in the rightward direction in FIG. 1 by a driver operating an operation means. The operation means may be an unillustrated clutch lever. The pressure member 5 can be moved in the rightward direction against the urging force of the clutch spring 8, thus, in the direction away from the clutch member 4.

Thus, when the pressure member 5 moves in the rightward direction, the press-contact force of the driving-side clutch discs 6 and the driven-side clutch discs 7 is released. The rotational force input to the gear 1 and the clutch housing 2 is interrupted without being transmitted to the clutch member 4 and the shaft 3. That is, the pressure member 5, with the axial movement relative to the clutch member 4, is structured to be capable of bringing the driving-side clutch discs 6 and the driven-side clutch discs 7 into press-contact or releasing the press-contact force.

Further, as illustrated in FIG. 2 and FIGS. 5 to 9, the clutch member 4 and the pressure member 5 include the clutch-member-side first cam surfaces 4a and the clutch-member-side second cam surfaces 4b, and the pressure-member-side first cam surfaces 5a and the pressure-member-side second cam surfaces 5b, respectively. Each are constituted by an inclined surface inclined at a predetermined angle. Accordingly, the clutch-member-side first cam surfaces 4a and the pressure-member-side first cam surfaces 5a face each other to form a press-contact assisting cam. The clutch-member-side second cam surfaces 4b and the pressure-member-side second cam surfaces 5b face each other to form a back torque limiting cam.

The press-contact assisting cam can increase the press-contact force of the driving-side clutch discs 6 and the driven-side clutch discs 7 when the pressure member 5 and the clutch member 4 relatively rotate and move closer to each other. Thus, a state is established where the rotational force input to the clutch housing 2 (the input member) can be transmitted to the shaft 3 (the output member). That is, the press-contact assisting cam is structured so that, if a state is established where the rotational force input to the clutch housing 2 (the input member) can be transmitted to the shaft 3 (the output member), the clutch member 4 rotates relative to the pressure member 5 in the direction "a" as indicated in FIG. 12. Accordingly, the clutch-member-side first cam surfaces 4a and the pressure-member-side first cam surfaces 5a abut on each other. The action of the cam of the cam surfaces moves the pressure member 5 in the direction "b" to increase the press-contact force of the driving-side clutch discs 6 and the driven-side clutch discs 7.

The back torque limiting cam releases the press-contact force of the driving-side clutch discs 6 and the driven-side clutch discs 7 when the pressure member 5 and the clutch member 4 relatively rotate and move away from each other if the rotational speed of the shaft 3 (the output member) exceeds the rotational speed of the clutch housing 2 (the input member). That is, the back torque limiting cam is structured so that the clutch member 4 rotates relative to the pressure member 5 in the direction "c" as indicated in FIG. 13 if the rotational speed of the shaft 3 (the output member) exceeds the rotational speed of the clutch housing 2 (the input member). Accordingly, the clutch-member-side second cam surfaces 4b and the pressure-member-side second cam surfaces 5b abut on each other. The action of the cam of the cam surfaces moves the pressure member 5 in the direction "d" to release the press-contact force of the driving-side clutch discs 6 and the driven-side clutch discs 7.

The restricting member 10 is constituted by a member like an annular ring (see FIG. 10). It restricts the movement of the pressure member 5 beyond a predetermined dimension in a direction where the pressure member 5 moves away from the clutch member 4. As illustrated in FIG. 1 and FIGS. 3 to 5, the restricting member 10 is attached at ends of boss portions 4d. The boss portions are provided in the clutch member 4. The restricting member 10 is fixed with bolts B. In a state where the restricting member 10 is fixed to the clutch member 4 with the bolts B, a surface 10a of the restricting member 10 faces the pressure member 5. A back surface 10b of the restricting member 10 faces the outside of the device.

In the pressure member 5, according to the present embodiment as illustrated in FIGS. 6 and 9, a plurality of (three in the present embodiment) depressed portions 5c are provided at regular intervals in a circumferential direction. As illustrated in FIGS. 1 and 5, the clutch springs 8 are accommodated and attached in the corresponding depressed portions 5c. The clutch spring 8 is attached while its one end 8a abuts on the surface 10a of the restricting member 10. Its other end 8b abuts on the bottom surface of the depressed portion 5c or in the vicinity of the bottom surface. This spring 8 adds urging force to the pressure member 5 in a direction where the driving-side clutch discs 6 and the driven-side clutch discs 7 are brought into press-contact (the axial direction).

Specifically, as illustrated in FIG. 11, the clutch spring 8 is constituted by a coil spring. It extends in a spiral from the one end 8a to the other end 8b. It is structured to have an outer circumferential side surface 8c and an inner circumferential side surface 8d in its longitudinal direction (the direction from the one end 8a toward the other end 8b). Thus, when the clutch springs 8 are accommodated in the depressed portions 5c and the restricting member 10 is fixed at ends of the boss portions 4d, the restricting member 10 shrinks the clutch springs 8. This adds urging force to the pressure member 5 in the direction where the driving-side clutch discs 6 and the driven-side clutch discs 7 are brought into press-contact (the axial direction).

The clutch spring 8 according to the present embodiment is structured so that, when the pressure member 5 rotates relative to the clutch member 4 because of the clearance between the cam surfaces of the press-contact assisting cam or the back torque limiting cam (in the present embodiment, the clearance caused between the clutch-member-side first cam surface 4a and the pressure-member-side first cam surface 5a or the clearance caused between the clutch-member-side second cam surface 4b and the pressure-member-side second cam surface 5b), the one end 8a of the spring slides on the surface 10a of the restricting member 10 while a side surface (the outer circumferential side surface 8c) is held in the longitudinal direction. Thus, rotational resistance can be generated accordingly.

The clutch springs 8 according to the present embodiment are accommodated and attached in the depressed portions 5c provided in the pressure member 5. The springs 8 are structured so that, when the pressure member 5 rotates relative to the clutch member 4, because of the press-contact assisting cam or the back torque limiting cam, the outer circumferential side surfaces 8c in the longitudinal direction abut the inner circumferential wall surface 5d of the depressed portions 5c. Thus, the springs 8 are held on the inner circumferential wall surfaces 5d of the depressed portions 5c.

For example, as illustrated in FIG. 14, the back torque limiting cam operates in a state (a set state). The clutch-member-side first cam surface 4a and the pressure-member-side first cam surface 5a, that constitute the press-contact assisting cam, abut on each other. Also, the clutch-member-side second cam surface 4b and the pressure-member-side second cam surface 5b that constitute the back torque limiting cam, face each other with clearance of a dimension t, as illustrated in FIG. 14. Thus, as the pressure member 5 rotates relative to the clutch member 4, the clutch-member-side first cam surface 4a and the pressure-member-side first cam surface 5a, that constitute the press-contact assisting cam, move away from each other. Also, the clutch-member-side second cam surface 4b and the pressure-member-side second cam surface 5b, that constitute the back torque limiting cam, move closer to each other.

As illustrated in FIG. 16, the clutch-member-side second cam surface 4b and the pressure-member-side second cam surface 5b, that constitute the back torque limiting cam, abut on each other. The pressure member 5 further rotates relative to the clutch member 4. The action of the cam moves the pressure member 5 and the clutch member 4 away from each other and releases the press-contact force of the driving-side clutch discs 6 and the driven-side clutch discs 7.

When the operation of the back torque limiting cam is completed and the set state is recovered, with the rotation of the pressure member 5 relative to the clutch member 4, the clutch-member-side first cam surface 4a and the pressure-member-side first cam surface 5a, that constitute the press-contact assisting cam, move closer to each other (see FIG. 15) and then abut on each other (see FIG. 14) while the clutch-member-side second cam surface 4b and the pressure-member-side second cam surface 5b, that constitute the back torque limiting cam, move away from each other (see FIGS. 14 and 15).

In the clutch spring 8 according to the present embodiment, when the back torque limiting cam operates from the set state (and also, similarly, when the operation of the back torque limiting cam is completed and the set state is recovered), as illustrated in FIG. 15, the outer circumferential side surface 8c, in the longitudinal direction, abuts the depressed portion 5c. The spring 8 is held on the inner circumferential wall surface 5d of the depressed portion 5c. Thus, leaning or bending due to rotational force is suppressed while the one end 8a slides on the surface 10a of the restricting member 10 to generate rotational resistance. Accordingly, impact caused when the cam surfaces abut on each other can be eased and hitting noise can be suppressed.

In particular, in the present embodiment, the dimension t of the clearance between the clutch-member-side second cam surface 4b and the pressure-member-side second cam surface 5b, that constitute the back torque limiting cam, is set to be larger than the value obtained by subtracting the dimension of the outside diameter of the clutch spring 8 (the diameter of the outer circumferential side surface 8c) from the dimension of the opening diameter of the depressed portion 5c. As a result, rotational resistance can be added with higher reliability while leaning or bending of the clutch spring 8 can be suppressed.

Thus, at normal times, the clutch spring 8, according to the present embodiment, has a function of adding urging force in the axial direction. This brings the driving-side clutch discs 6 and the driven-side clutch discs 7 into press-contact. The spring 8 has a function of generating rotational resistance by the one end 8a sliding on a surface of the restricting member 10 when the pressure member 5 rotates relative to the clutch member 4 because of the clearance between the cam surfaces of the back torque limiting cam (or the press-contact assisting cam).

Next, a second embodiment of the present disclosure is described.

Similar to the first embodiment, a power transmission device according to the second embodiment, that is obtainable by die casting, is arranged in a vehicle, such as a two-wheel vehicle. The device, as desired, transmits the driving power of an engine to a transmission or a driving wheel or interrupt the driving power. As illustrated in FIGS. 17 to 28, the power transmission device is mainly made up of a clutch housing 2 with a gear 1 as an input member. A clutch member 4 is coupled to a shaft 3 as an output member. The device has a pressure member 5, driving-side clutch discs 6 and driven-side clutch discs 7, clutch springs 8, a restricting member 10, and accommodating members 11. Identical reference signs are given to components similar to those in the first embodiment and detailed description thereof will be omitted.

In the pressure member 5 according to the present embodiment, as illustrated in FIGS. 22, 23, and 25, a plurality of (three in the present embodiment) insertion holes h are provided at regular intervals in a circumferential direction. As illustrated in FIGS. 17 and 21, the accommodating members 11 are attached in the corresponding insertion holes h. The clutch springs 8 are accommodated and attached in the corresponding accommodating members 11. As illustrated in FIGS. 22, 23, 27, and 28, the accommodating member 11 is constituted by a tubular member with a bottom, that includes an accommodating-member-side cam surface 11a, an inner circumferential wall surface 11b, and a flange portion 11c. The accommodating member 11 is attached while accommodating the clutch spring 8 so that the flange portion 11c abuts on an opening edge portion of the insertion hole h.

Further, as illustrated in FIG. 18 and FIGS. 21 to 25, the clutch member 4 and the pressure member 5 include clutch-member-side first cam surfaces 4a and clutch-member-side second cam surfaces 4b, and pressure-member-side first cam surfaces 5a, respectively. Each is constituted by an inclined surface inclined at a predetermined angle. Thus, the clutch-member-side first cam surfaces 4a and the pressure-member-side first cam surfaces 5a are caused to face each other to form a press-contact assisting cam. The clutch-member-side second cam surfaces 4b and the accommodating-member-side cam surfaces 11a, included in the accommodating members 11, are caused to face each other to form a back torque limiting cam.

The restricting member 10 is constituted by a member like an annular ring (see FIG. 26). The restricting member 10 restricts the movement of the pressure member 5 beyond a predetermined dimension in a direction where the pressure member 5 moves away from the clutch member 4 and, as illustrated in FIG. 17 and FIGS. 19 to 21, is attached at ends of boss portions 4d provided in the clutch member 4 and fixed with bolts B. In a state where the restricting member 10 is fixed to the clutch member 4 with the bolts B, a surface 10a of the restricting member 10 faces the pressure member 5 and a back surface 10b of the restricting member 10 faces the outside of the device.

Similar to the first embodiment, the clutch spring 8 according to the present embodiment is attached so that one end 8a abuts on a surface 10a of the restricting member 10 and its other end 8b abuts on a bottom surface of the accommodating member 11 or the vicinity of the bottom surface. The spring 8 is structured to be capable of adding urging force to the pressure member 5 in a direction where the driving-side clutch discs 6 and the driven-side clutch discs 7 are brought into press-contact (the axial direction). Similar to the first embodiment, the clutch spring 8 is constituted by a coil spring. The spring 8 extends in a spiral from the one end 8a to the other end 8b. The spring 8 has an outer circumferential side surface 8c and an inner circumferential side surface 8d, in its longitudinal direction (the direction from the one end 8a toward the other end 8b) (see FIG. 11).

The clutch spring 8 according to the present embodiment is structured so that, when the pressure member 5 rotates relative to the clutch member 4, because of clearance between the cam surfaces of the press-contact assisting cam or the back torque limiting cam (in the present embodiment, the clearance caused between the clutch-member-side first cam surface 4a and the pressure-member-side first cam surface 5a or the clearance caused between the clutch-member-side second cam surface 4b and the accommodating-member-side cam surface 11a), the one end 8a of the spring slides on the surface 10a of the restricting member 10. A side surface of the spring 8, the outer circumferential side surface 8c, is held in the longitudinal direction. Thus, rotational resistance can be generated accordingly.

The clutch springs 8 according to the present embodiment are accommodated and attached in the accommodating member 11 attached in the pressure member 5. The springs 8 are structured so that, when the pressure member 5 rotates relative to the clutch member 4 because of the press-contact assisting cam or the back torque limiting cam, the outer circumferential side surfaces 8c, in the longitudinal direction, abut the accommodating member 11. The springs 8 are held on the inner circumferential wall surfaces 11b of the accommodating members 11.

For example, as illustrated in FIG. 29, the back torque limiting cam operates in a state (a set state) where the clutch-member-side first cam surface 4a and the pressure-member-side first cam surface 5a, that constitute the press-contact assisting cam, abut on each other. Also, the clutch-member-side second cam surface 4b and the accommodating-member-side cam surface 11a of the accommodating member 11, that constitute the back torque limiting cam, face each other with clearance of a dimension t, as illustrated in FIG. 30. With the rotation of the pressure member 5 relative to the clutch member 4, the clutch-member-side first cam surface 4a and the pressure-member-side first cam surface 5a, that constitute the press-contact assisting cam, move away from each other. Also, the clutch-member-side second cam surface 4b and the accommodating-member-side cam surface 11a, that constitute the back torque limiting cam, move closer to each other.

As illustrated in FIG. 31, the clutch-member-side second cam surface 4b and the accommodating-member-side cam surface 11a, that constitute the back torque limiting cam, abut on each other. The pressure member 5 further rotates relative to the clutch member 4. The action of the cam moves the pressure member 5 and the clutch member 4 away from each other and releases the press-contact force of the driving-side clutch discs 6 and the driven-side clutch discs 7.

When the operation of the back torque limiting cam is completed and the set state is recovered, with the rotation of the pressure member 5 relative to the clutch member 4, the clutch-member-side first cam surface 4*a* and the pressure-member-side first cam surface 5*a*, that constitute the press-contact assisting cam, move closer to each other (see FIG. 30) and then abut on each other (see FIG. 29). Also, the clutch-member-side second cam surface 4*b* and the accommodating-member-side cam surface 11*a*, that constitute the back torque limiting cam, move away from each other (see FIGS. 29 and 30).

In the clutch spring 8 according to the present embodiment, when the back torque limiting cam operates from the set state (and also, similarly, when the operation of the back torque limiting cam is completed and the set state is recovered), as illustrated in FIG. 30, the outer circumferential side surface 8*c*, in the longitudinal direction, abuts the accommodating member 11. The spring is held on the inner circumferential wall surface 11*b* of the accommodating member 11. Thus, leaning or bending due to rotational force is suppressed. The one end 8*a* of the spring slides on the surface 10*a* of the restricting member 10 to generate rotational resistance. Accordingly, impact caused when the cam surfaces abut on each other can be eased and hitting noise can be suppressed.

In particular, in the present embodiment, the dimension t of the clearance between the clutch-member-side second cam surface 4*b* and the accommodating-member-side cam surface 11*a*, that constitute the back torque limiting cam, is set to be larger than the value obtained by subtracting the dimension of the outside diameter of the clutch spring 8 (the diameter of the outer circumferential side surface 8*c*) from the dimension of the opening diameter of the accommodating member 11. As a result, rotational resistance can be added with higher reliability. Also, leaning or bending of the clutch spring 8 can be suppressed.

Thus, at normal times, the clutch spring 8, according to the present embodiment, has a function of adding urging force in the axial direction. This brings the driving-side clutch discs 6 and the driven-side clutch discs 7 into press-contact. Also, the spring has a function of generating rotational resistance by the one end 8*a* of the spring sliding on the surface 10*a* of the restricting member 10 when the pressure member 5 rotates relative to the clutch member 4 because of the clearance between the cam surfaces of the back torque limiting cam (or the press-contact assisting cam).

Next, a third embodiment of the present disclosure is described.

Similar to the first and second embodiments, a power transmission device according to the third embodiment, that is obtainable by die casting, is arranged in a vehicle, such as a two-wheel vehicle. It transmits the driving power of an engine to a transmission or a driving wheel or interrupts the driving power as desired. As illustrated in FIGS. 32 to 40, the power transmission device includes a clutch housing 2 with a gear 1 as an input member. A clutch member 4 coupled to a shaft 3 is an output member. A pressure member 5, driving-side clutch discs 6 and driven-side clutch discs 7, clutch springs 8, a restricting member 10, and spring seats 12 are included. The spring seats 12 each constitute a seat surface of the clutch spring 8. Identical reference signs are given to components similar to those in the first and second embodiments and their detailed description will be omitted.

In the clutch member 4, according to the present embodiment, as illustrated in FIGS. 36 and 38, a plurality of (three in the present embodiment) boss portions 4*d* are provided at regular intervals in a circumferential direction. As illustrated in FIGS. 32 and 35, the clutch springs 8 are inserted in the corresponding boss portions 4*d*. When the clutch spring 8 is attached in the boss portion 4*d*, its one end 8*a* abuts on a surface 10*a* of the restricting member 10. Its other end 8*b* abuts on the spring seat 12 attached to the pressure member 5. The spring seat 12 forms a seat surface of the clutch spring 8. It is structured to be capable of pressing the pressure member 5 on reception of the urging force of the clutch spring 8.

Further, as illustrated in FIGS. 32 to 39, the clutch member 4 and the pressure member 5 include clutch-member-side first cam surfaces 4*a* and clutch-member-side second cam surfaces 4*b*, and pressure-member-side first cam surfaces 5*a* and pressure-member-side second cam surfaces 5*b*, respectively. Each constitutes an inclined surface inclined at a predetermined angle. Accordingly, the clutch-member-side first cam surfaces 4*a* and the pressure-member-side first cam surfaces 5*a* face each other to form a press-contact assisting cam. The clutch-member-side second cam surfaces 4*b* and the pressure-member-side second cam surfaces 5*b* face each other to form a back torque limiting cam.

The restricting member 10 is constituted by a member like an annular ring (see FIG. 40). It restricts the movement of the pressure member 5 beyond a predetermined dimension in a direction where the pressure member 5 moves away from the clutch member 4. As illustrated in FIG. 32 and FIGS. 33 to 35, the restricting member 10 is attached at ends of the boss portions 4*d* provided on the clutch member 4 and fixed with bolts B. In a state where the restricting member 10 is fixed to the clutch member 4, by the bolts B, a surface 10*a* of the restricting member 10 faces the pressure member 5. A back surface 10*b* of the restricting member 10 faces the outside of the device.

Similar to the first and second embodiments, the clutch spring 8 is attached so that the one end 8*a* abuts on the surface 10*a* of the restricting member 10. The other end 8*b* abuts on the spring seat 12. The spring 8 adds urging force to the pressure member 5 in a direction where the driving-side clutch discs 6 and the driven-side clutch discs 7 are brought into press-contact (the axial direction). Similar to the first and second embodiments, the clutch spring 8 is constituted by a coil spring. It extends in a spiral from the one end 8*a* to the other end 8*b*. The spring 8 has an outer circumferential side surface 8*c* and an inner circumferential side surface 8*d* in its longitudinal direction (the direction from the one end 8*a* toward the other end 8*b*) (see FIG. 11).

The clutch spring 8, according to the present embodiment, is structured so that the pressure member 5 rotates relative to the clutch member 4 because of clearance between the cam surfaces of the press-contact assisting cam or the back torque limiting cam. In the present embodiment, the clearance is caused between the clutch-member-side first cam surface 4*a* and the pressure-member-side first cam surface 5*a*. Also, the clearance is caused between the clutch-member-side second cam surface 4*b* and the pressure-member-side second cam surface 5*b*. The other end 8*b* of the spring 8 slides on a surface of the spring seat 12. A side surface of the spring, the inner circumferential side surface 8*d*, is held in the longitudinal direction, and rotational resistance can be generated accordingly.

The clutch springs 8 are inserted and attached in the boss portions 4*d* of the clutch member 4. The springs 8 are structured so that, when the pressure member 5 rotates relative to the clutch member 4 because of the press-contact assisting cam or the back torque limiting cam, the inner circumferential side surfaces 8*d* in the longitudinal direction, abuts the boss portion 4*d*. The springs 8 are held on the outer circumferential surfaces of the boss portions 4*d*.

For example, as illustrated in FIG. 41, the back torque limiting cam operates in a state (a set state) where the clutch-member-side first cam surface 4*a* and the pressure-member-side first cam surface 5*a*, that constitute the press-contact assisting cam, abut each other. The clutch-member-side second cam surface 4*b* and the pressure-member-side second cam surface 5*b*, that constitute the back torque limiting cam, face each other with clearance of a dimension t, as illustrated in FIG. 42. Rotation of the pressure member 5 relative to the clutch member 4 causes the clutch-member-side first cam surface 4*a* and the pressure-member-side first cam surface 5*a*, that constitute the press-contact assisting cam, to move away from each other. The clutch-member-side second cam surface 4*b* and the pressure-member-side second cam surface 5*b*, that constitute the back torque limiting cam, move closer to each other.

As illustrated in FIG. 43, the clutch-member-side second cam surface 4*b* and the pressure-member-side second cam surface 5*b*, that constitute the back torque limiting cam, abut each other. The pressure member 5 further rotates relative to the clutch member 4. This action of the cam moves the pressure member 5 and the clutch member 4 away from each other and releases the press-contact force of the driving-side clutch discs 6 and the driven-side clutch discs 7.

When the operation of the back torque limiting cam is completed and the set state is recovered, with the rotation of the pressure member 5 relative to the clutch member 4, the clutch-member-side first cam surface 4*a* and the pressure-member-side first cam surface 5*a*, that constitute the press-contact assisting cam, move closer to each other (see FIG. 42). They then abut each other (see FIG. 41) while the clutch-member-side second cam surface 4*b* and the pressure-member-side second cam surface 5*b*, that constitute the back torque limiting cam, move away from each other (see FIGS. 41 and 42).

In the clutch spring 8 according to the present embodiment, when the back torque limiting cam operates from the set state (and also, similarly, when the operation of the back torque limiting cam is completed and the set state is recovered), as illustrated in FIG. 42, the inner circumferential side surface 8*d*, in the longitudinal direction, abuts the boss portion 4*d*. The spring 8 is held on the outer circumferential surface of the boss portion 4*d*. The spring 8 leaning or bending due to rotational force is suppressed. The other end 8*b* of the spring 8 slides on a surface of the spring seat 12 to generate rotational resistance. Accordingly, impact caused when the cam surfaces abut each other can be eased and hitting noise can be suppressed.

In particular, in the present embodiment, the dimension t of the clearance between the clutch-member-side second cam surface 4*b* and the pressure-member-side second cam surface 5*b*, that constitute the back torque limiting cam, is set to be larger than the value obtained by subtracting the dimension of the outside diameter of the boss portion 4*d* (the diameter) from the dimension of the inside diameter of the clutch spring 8 (the diameter of the inner circumferential side surface 8*d*). As a result, rotational resistance can be added with higher reliability while leaning or bending of the clutch spring 8 can be suppressed.

Thus, at normal times, the clutch spring 8 according to the present embodiment has a function of adding urging force in the axial direction. The force brings the driving-side clutch discs 6 and the driven-side clutch discs 7 into press-contact. The spring 8 has a function of generating rotational resistance by the other end 8*b* sliding on a surface of the spring seat 12 when the pressure member 5 rotates relative to the clutch member 4 because of the clearance between the cam surfaces of the back torque limiting cam (or press-contact assisting cam).

According to the above-described first and second embodiments, the pressure member 5 rotates relative to the clutch member 4 because of the clearance between cam surfaces of the press-contact assisting cam or the back torque limiting cam. The clutch spring 8 can generate rotational resistance by the one end 8*a* of the spring sliding on the surface 10*a* of the restricting member 10 while a side surface (the outer circumferential side surface 8*c* in the first and second embodiments) is held in the longitudinal direction. Thus, the rotational resistance can be added to the rotation of the pressure member 5 relative to the clutch member 4 by using the clutch springs 8. Thus, impact or hitting noise can be suppressed when the cam surfaces of the press-contact assisting cam or the back torque limiting cam abut each other. This occurs without employing any other dedicated member (by utilizing the restricting member 10).

According to the above-described third embodiment, the pressure member 5 rotates relative to the clutch member 4 because of the clearance between the cam surfaces of the press-contact assisting cam or the back torque limiting cam. The clutch spring 8 can generate rotational resistance by the other end 8*b* of the spring sliding on a surface of the spring seat 12 while a side surface (the inner circumferential side surface 8*d* in the third embodiment) is held in the longitudinal direction. Thus, the rotational resistance can be added to the rotation of the pressure member 5 relative to the clutch member 4 by using the clutch springs 8. Thus, impact or hitting noise is suppressed when the cam surfaces of the press-contact assisting cam or the back torque limiting cam abut each other. This occurs without employing any other dedicated member (by utilizing the spring seats 12).

In particular, according to the above-described first embodiment, the clutch springs 8 are accommodated and attached in the depressed portions 5*c* provided in the pressure member 5. The pressure member 5 rotates relative to the clutch member 4 because of the press-contact assisting cam or the back torque limiting cam. The outer circumferential side surface 8*c*, in the longitudinal direction abuts the depressed portions 5*c*. The spring 8 is held on the inner circumferential wall surface 5*d* of the depressed portion 5*c*. Accordingly, the inner circumferential wall surface 5*d* of the depressed portion 5*c* can prevent the clutch spring 8 from leaning or bending when rotational resistance is generated. Accordingly, necessary rotational resistance can be generated with higher reliability.

According to the above-described second embodiment, the clutch springs 8 are accommodated and attached in the accommodating members 11 attached in the pressure member 5. The pressure member 5 rotates relative to the clutch member 4 because of the press-contact assisting cam or the back torque limiting cam. The outer circumferential side surface 8*c* of the spring 8 in the longitudinal direction, abuts the accommodating member 11. The spring 8 is held on the inner circumferential wall surface 11*b* of the accommodating member 11. Accordingly, the inner circumferential wall surface 11*b* of the accommodating member 11 can prevent the clutch spring 8 from leaning or bending when rotational resistance is generated. Accordingly, necessary rotational resistance can be generated with higher reliability.

In addition, according to the above-described third embodiment, the clutch springs 8 are inserted and attached in the boss portions 4d on the clutch member 4. The spring 8 is structured so that, when the pressure member 5 rotates relative to the clutch member 4, because of the press-contact assisting cam or the back torque limiting cam, the inner circumferential side surface 8d, in the longitudinal direction, abuts the boss portion 4d. The spring is held on the outer circumferential surface of the boss portion 4d. Accordingly, the outer circumferential surface of the boss portion 4d can prevent the clutch spring 8 from leaning or bending when rotational resistance is generated. Accordingly, necessary rotational resistance can be generated with higher reliability.

Although the present embodiments are described above, the present disclosure is not limited to these embodiments. For example, regarding the surface 10a of the restricting member 10 or a surface of the spring seat 12, it is preferable that the sliding surface on which at least the one end 8a or the other end 8b of the clutch spring 8 slides be formed by hardening. Preferably by carburization or the like being employed as the hardening. Thus, regarding the restricting member 10 or the spring seat 12, forming the sliding surface on which at least the one end 8a or the other end 8b of the clutch spring 8 slides, by hardening, makes it possible to suppress wearing of the sliding surface of the restricting member 10 or the spring seat 12 due to repeated sliding. This prevents poor movement caused by the wearing.

Although both of the press-contact assisting cam and the back-torque limiting cam are provided in the present embodiments, for example, the present disclosure may be applied to a power transmission device including the back-torque limiting cam only instead of further including the press-contact assisting cam. In addition, the power transmission device according to the present disclosure is applicable not only to motorcycles but also to various multiple disc clutch type power transmission devices used for automobiles, three-wheel or four-wheel buggies, or machines for general use.

INDUSTRIAL APPLICABILITY

The present disclosure is also applicable to, for example, a power transmission device with a different external appearance or with another added function as long as the power transmission device enables that, when the pressure member rotates relative to the clutch member because of the clearance between the cam surfaces of the press-contact assisting cam or the back torque limiting cam, rotational resistance is generated by one end or the other end sliding on a surface of the restricting member or the spring seat that constitutes a seat surface of the clutch spring while a side surface of the clutch spring is held in the longitudinal direction.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
   a clutch housing that rotates with an input member;
   a plurality of driving-side clutch discs are attached to the clutch housing;
   a clutch member with a plurality of driven-side clutch discs, the clutch member coupled to an output member, the driven-side clutch discs being arranged alternately with the driving-side clutch discs of the clutch housing;
   a pressure member attached to the clutch member, the pressure member moving in an axial direction of the clutch member, the pressure member, via movement in the axial direction relative to the clutch member, bringing the driving-side clutch discs and the driven-side clutch discs into press-contact or releasing a press-contact force;
   a restricting member attached to the clutch member, the restricting member restricting movement of the pressure member away from the clutch member by a predetermined dimension;
   a clutch spring, one end of the clutch spring abutting on a surface of the restricting member and adding urging force to the pressure member in a direction where the driving-side clutch discs and the driven-side clutch discs are brought into the press-contact; and
   a press-contact assisting cam or a back-torque limiting cam, the press-contact assisting cam being capable of increasing the press-contact force of the driving-side clutch discs and the driven-side clutch discs when the pressure member and the clutch member relatively rotate to move closer to each other, if a state is established where rotational force input to the input member is transmittable to the output member, the back-torque limiting cam releasing the press-contact force of the driving-side clutch discs and the driven-side clutch discs when the pressure member and the clutch member relatively rotate to move away from each other if a rotational speed of the output member exceeds a rotational speed of the input member,
   the power transmission device transmitting the rotational force input to the input member to the output member or interrupting the rotational force through the press-contact of the driving-side clutch discs and the driven-side clutch discs or releasing the press-contact force;
   the clutch spring is accommodated and attached in a depressed portion provided in the pressure member and a clearance exists between cam surfaces of the press-contact assisting cam or the back torque limiting cam, and when the pressure member rotates relative to the clutch member, due to the clearance, the clutch spring generates rotational resistance by the one end of the spring sliding on a surface of the restricting member while an outer circumferential side surface in the longitudinal direction abuts and is held on an inner circumferential wall surface of the depressed portion; and
   the dimension of the clearance between cam surfaces of the press-contact assisting cam or the back torque limiting cam is set so as to be larger than the value obtained by subtracting the dimension of the outside diameter of the clutch spring from the dimension of the opening diameter of the depressed portion.

2. The power transmission device according to claim 1, wherein the restricting member is formed by hardening a sliding surface on which at least the one end of the clutch spring slides.

3. A power transmission device comprising:
   a clutch housing that rotates with an input member;
   a plurality of driving-side clutch discs are attached to the clutch housing;
   a clutch member with a plurality of driven-side clutch discs, the clutch member coupled to an output member, the driven-side clutch discs being arranged alternately with the driving-side clutch discs of the clutch housing;

a pressure member attached to the clutch member, the pressure member moving in an axial direction of the clutch member, the pressure member, via movement in the axial direction relative to the clutch member, bringing the driving-side clutch discs and the driven-side clutch discs into press-contact or releasing a press-contact force;

a restricting member attached to the clutch member, the restricting member restricting movement of the pressure member away from the clutch member by a predetermined dimension;

a clutch spring, one end of the clutch spring abutting on a surface of the restricting member and adding urging force to the pressure member in a direction where the driving-side clutch discs and the driven-side clutch discs are brought into the press contact; and a press-contact assisting cam or a back-torque limiting cam, the press- contact assisting cam being capable of increasing the press-contact force of the driving side clutch discs and the driven-side clutch discs when the pressure member and the clutch member relatively rotate to move closer to each other, if a state is established where rotational force input to the input member is transmittable to the output member, the back-torque limiting cam releasing the press-contact force of the driving-side clutch discs and the driven-side clutch discs when the pressure member and the clutch member relatively rotate to move away from each other if a rotational speed of the output member exceeds a rotational speed of the input member, the power transmission device transmitting the rotational force input to the input member to the output member or interrupting the rotational force through the press-contact of the driving-side clutch discs and the driven-side clutch discs or releasing the press-contact force;

the clutch spring is accommodated and attached in an accommodating member on the pressure member and a clearance exists between cam surfaces of the press-contact assisting cam or the back torque limiting cam, and when the pressure member rotates relative to the clutch member, due to clearance between cam surfaces of the press-contact assisting cam or the back torque limiting cam, the clutch spring generates rotational resistance by the one end of the spring sliding on a surface of the restricting member while an outer circumferential side surface of the spring, in the longitudinal direction, abuts and is held on an inner circumferential wall surface of the accommodating member; and the dimension of the clearance between cam surfaces of the press-contact assisting cam or the back torque limiting cam is set so as to be larger than the value obtained by subtracting the dimension of the outside diameter of the clutch spring from the dimension of the opening diameter of the accommodating member.

4. The power transmission device according to claim 3, wherein the restricting member is formed by hardening a sliding surface on which at least the one end of the clutch spring slides.

5. A power transmission device comprising:
a clutch housing that rotates with an input member;
a plurality of driving-side clutch discs are attached to the clutch housing;

a clutch member with a plurality of driven-side clutch discs, the clutch member coupled to an output member, the driven-side clutch discs being arranged alternately with the driving-side clutch discs of the clutch housing;

a pressure member attached to the clutch member, the pressure member moving in an axial direction of the clutch member, the pressure member, via movement in the axial direction relative to the clutch member, bringing the driving-side clutch discs and the driven-side clutch discs into press-contact or releasing a press-contact force;

a restricting member attached to the clutch member, the restricting member restricting movement of the pressure member away from the clutch member by a predetermined dimension;

a clutch spring, one end of the clutch spring abutting on a surface of the restricting member and adding urging force to the pressure member in a direction where the driving- side clutch discs and the driven-side clutch discs are brought into the press contact; and a press-contact assisting cam or a back-torque limiting cam, the press-contact assisting cam being capable of increasing the press-contact force of the driving side clutch discs and the driven-side clutch discs when the pressure member and the clutch member relatively rotate to move closer to each other, if a state is established where rotational force input to the input member is transmittable to the output member, the back-torque limiting cam releasing the press-contact force of the driving-side clutch discs and the driven-side clutch discs when the pressure member and the clutch member relatively rotate to move away from each other if a rotational speed of the output member exceeds a rotational speed of the input member, the power transmission device transmitting the rotational force input to the input member to the output member or interrupting the rotational force through the press-contact of the driving-side clutch discs and the driven-side clutch discs or releasing the press-contact force;

the clutch spring is inserted and attached in a boss portion provided on the clutch member and a clearance exists between cam surfaces of the press-contact assisting cam or the back torque limiting cam, and when the pressure member rotates relative to the clutch member, due to clearance between cam surfaces of the press-contact assisting cam or the back torque limiting cam, the clutch spring generates rotational resistance by the an other end of the spring sliding on the surface of the spring seat that constitutes a seat surface of the clutch spring while an inner circumferential side surface of the spring, in the longitudinal direction, abuts and is held on an outer circumferential surface of the boss portion; and the dimension of the clearance between cam surfaces of the press-contact assisting cam or the back torque limiting cam is set so as to be larger than the value obtained by subtracting the dimension of the diameter of the boss portion from the dimension of the inner diameter of the clutch spring.

6. The power transmission device according to claim 5, wherein the spring seat is formed by hardening a sliding surface on which at least the other end of the clutch spring slides.

* * * * *

UNITED STATES PATENT AND TRADEMARK OFFICE
CERTIFICATE OF CORRECTION

PATENT NO. : 11,391,328 B2
APPLICATION NO. : 16/751453
DATED : July 19, 2022
INVENTOR(S) : Makoto Kataoka et al.

Page 1 of 1

It is certified that error appears in the above-identified patent and that said Letters Patent is hereby corrected as shown below:

In the Claims

<u>Column 20</u>
Line 48, Claim 5     after "by", delete "the"

Signed and Sealed this
Eighth Day of November, 2022

Katherine Kelly Vidal
*Director of the United States Patent and Trademark Office*